United States Patent [19]
Plamondon

[11] Patent Number: 5,077,802

[45] Date of Patent: Dec. 31, 1991

[54] APPARATUS AND METHOD FOR DIGITIZING AND SEGMENTING A HANDWRITING MOVEMENT BASED ON CURVILINEAR AND ANGULAR VELOCITIES

[75] Inventor: Réjean Plamondon, Ste-Julie, Canada

[73] Assignee: Ecole Polytechnique, Montreal, Canada

[21] Appl. No.: 653,672

[22] Filed: Feb. 11, 1991

[51] Int. Cl.[5] .......... G06K 9/00

[52] U.S. Cl. .......... 382/3; 382/9; 382/13

[58] Field of Search .......... 382/3, 13, 9

[56] References Cited

U.S. PATENT DOCUMENTS

| | | | |
|---|---|---|---|
| 3,699,517 | 10/1972 | Dyche | 382/3 |
| 3,955,178 | 5/1976 | Warfel | 382/3 |
| 3,962,679 | 6/1976 | Enselbrecht | 382/3 |
| 4,028,674 | 6/1977 | Chuang | 382/3 |
| 4,040,010 | 8/1977 | Crane et al. | 382/3 |
| 4,078,226 | 3/1978 | EerNisse | 382/3 |
| 4,128,829 | 12/1978 | Herbst | 382/3 |
| 4,190,820 | 2/1980 | Crane | 382/3 |
| 4,286,255 | 8/1981 | Siy | 382/3 |
| 4,475,235 | 10/1984 | Graham | 382/3 |
| 4,495,644 | 1/1985 | Parks et al. | 362/3 |
| 4,553,258 | 11/1985 | Chainer et al. | 382/3 |
| 4,597,101 | 6/1986 | Kishimoto | 382/3 |
| 4,703,511 | 10/1987 | Conoval | 382/3 |
| 4,736,445 | 4/1988 | Gundersen | 382/3 |
| 4,789,934 | 12/1988 | Gundersen et al. | 382/3 |
| 4,856,077 | 8/1989 | Rothfjell | 382/3 |

*Primary Examiner*—Leo H. Boudreau
*Assistant Examiner*—Barry Stellrecht
*Attorney, Agent, or Firm*—Collard, Roe & Galgano

[57] ABSTRACT

The apparatus and method for digitizing and segmenting a handwriting movement comprises an electrical transducer for generating three electrical digital position signals characterizing a trajectory of the handwriting movement. The apparatus comprises a device for low-pass filtering the electrical signals; a device for deriving the electrical signals by predetermined time and transfer functions for generating $V_x$ and $V_y$ electrical components which represent respectively speeds of the point according to X and Y axes of a cartesian reference; and a device for calculating $V_\sigma$ and $V_{74}$ values from the $V_x$ and $V_y$ values. The apparatus also comprises a device for calculating handwritten components and handwritten strings, where each of the handwritten components is delimited by two successive liftings of the point along the trajectory, and each of the handwritten strings is delimited by two successive portions of the trajectory where the $V_\theta$ value is higher than a predetermined angular speed value and the $V_\sigma$ value is lower than a predetermined curvilinear speed value.

26 Claims, 10 Drawing Sheets

| TYPE OF TABLET | SUMMA MM1201 | PENCEPT 300 |
|---|---|---|
| - PROXIMITY (INCH)<br>- PRECISION (INCH)<br>- NOISE (INCH)<br>- CONSTANCY (INCH) | 0.5<br>± 0.025<br>± 0.005<br>± 0.010 | 1.0<br>± 0.005<br>± 0.001<br>± 0.001 |
| TRANSMISSION<br>- LENGTH OF A WORD (BIT)<br>- STOP BITS (BIT)<br>- PARITY<br>- SPEED (BAUDS) | 8<br>1<br><br>9600 | 8<br>1<br><br>9600 |
| ACQUISITION MODE | PROXIMITY | |
| RESOLUTION (1/INCH) | 1000 | |
| SAMPLING FREQUENCY (Hz) | 100 | 100 |

FIG. 3

| BIT | 7 | 6 | 5 | 4 | 3 | 2 | 1 | 0 |
|---|---|---|---|---|---|---|---|---|
| Octet 1 | 1 | Prx | T | 1 | 1 | x | Sid | Dwn |
| Octet 2 | 0 | X6 | X5 | X4 | X3 | X2 | X1 | X0 |
| Octet 3 | 0 | X13 | X12 | X11 | X10 | X9 | X8 | X7 |
| Octet 4 | 0 | Y6 | Y5 | Y4 | Y3 | Y2 | Y1 | Y0 |
| Octet 5 | 0 | Y6 | Y12 | Y11 | Y10 | Y9 | Y8 | Y7 |

FIG. 4

| BIT | 7 | 6 | 5 | 4 | 3 | 2 | 1 | 0 |
|---|---|---|---|---|---|---|---|---|
| Octet 1 | 1 | 1 | 0 | 1 | 1 | Dwn | Sid | Prx |
| Octet 2 | X6 | 0 | X5 | X4 | X3 | X2 | X1 | X0 |
| Octet 3 | X13 | 0 | X12 | X11 | X10 | X9 | X8 | X7 |
| Octet 4 | Y6 | 0 | Y5 | Y4 | Y3 | Y2 | Y1 | Y0 |
| Octet 5 | Y13 | 0 | Y12 | Y11 | Y10 | Y9 | Y8 | Y7 |
| Octet 6 | Ax6 | 0 | Ax5 | Ax4 | Ax3 | Ax2 | Ax1 | Ax0 |
| Octet 7 | Ay6 | 0 | Ay5 | Ay4 | Ay3 | Ay2 | Ay1 | Ay0 |
| Octet 8 | 0 | 0 | Ay9 | Ay8 | Ay7 | Ax9 | Ax8 | Ax7 |

FIG. 5

FIG. 12
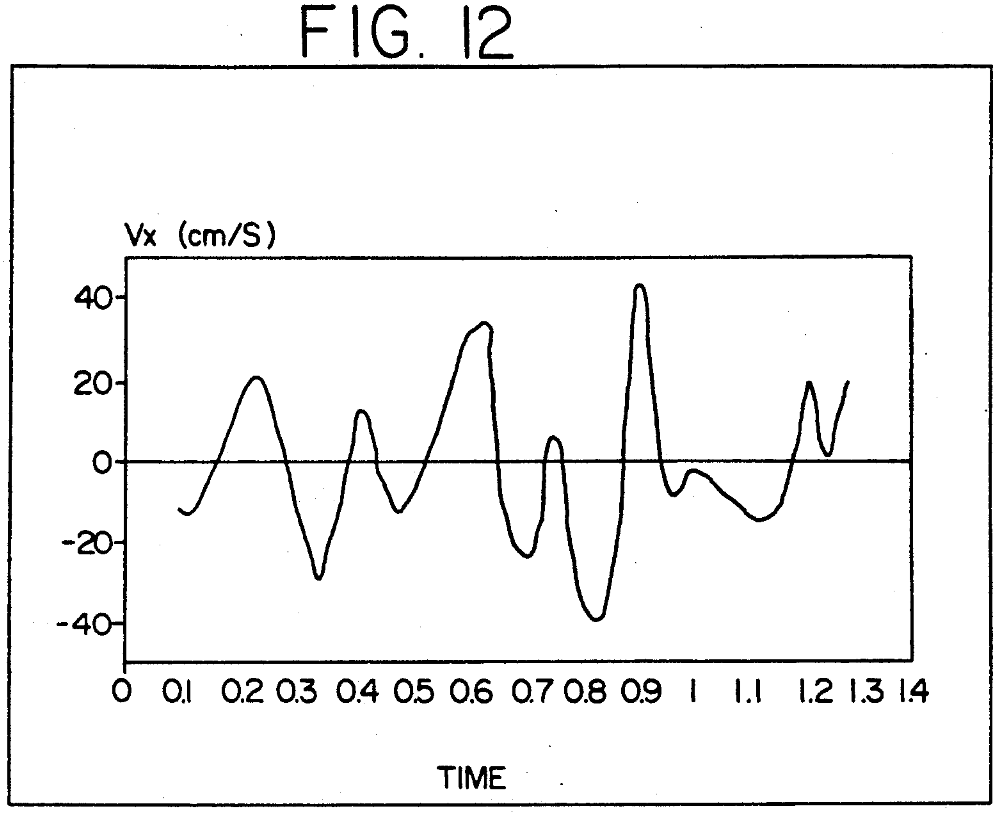
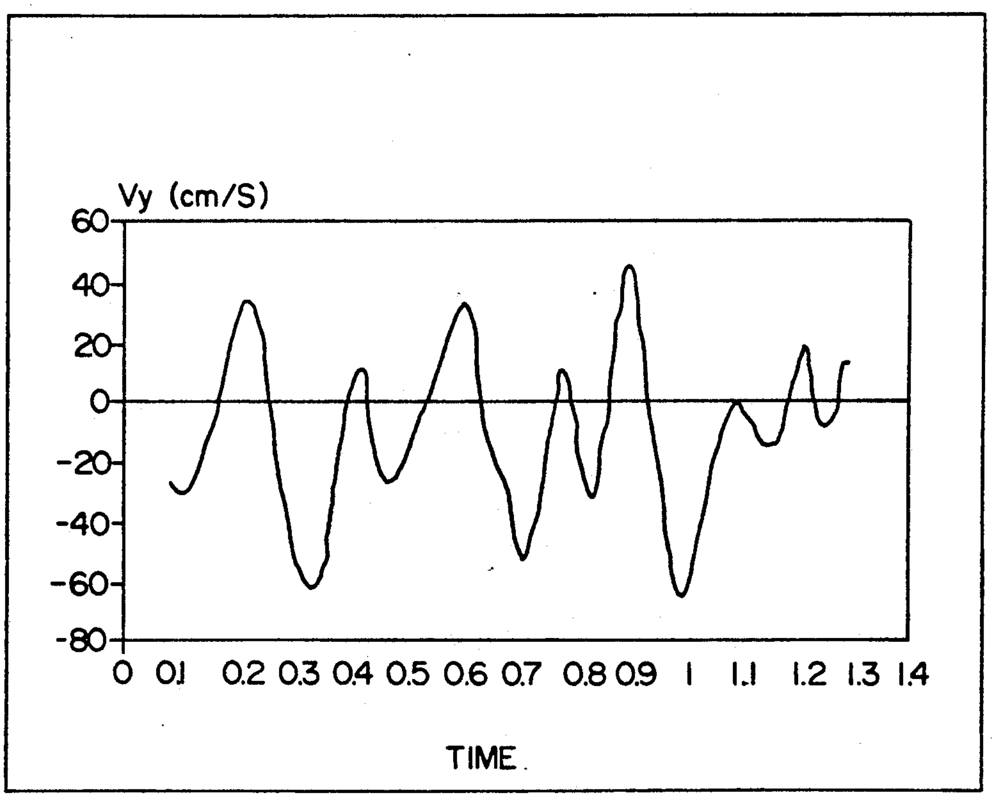
FIG. 13

APPARATUS AND METHOD FOR DIGITIZING AND SEGMENTING A HANDWRITING MOVEMENT BASED ON CURVILINEAR AND ANGULAR VELOCITIES

FIELD OF THE INVENTION

The present invention is concerned with an apparatus and a method for digitizing and segmenting a handwriting movement.

BACKGROUND OF THE INVENTION

Known in the art, there is the U.S. Pat. No. 4,495,644 of John R. PARKS et al, granted on Jan. 22, 1985, in which there is described an apparatus for signature verification. This apparatus uses a transducer pad in which the pressure of a stylus causes contact to be made between two resistive films. The resulting analogue voltage outputs are converted to digital form and processed under the control of a microprocessor to determine numeral parameters each representing a significant feature of the signature pattern. This apparatus comprises memory means in which is stored algorithms for identifying significant features of the signature, including upper and lower turning points of loops, points at which the pen is applied to or lifted from the paper, and lengths of segments of the signature measured as X or Y components or as resultant vectors of the path followed by the pen. These features might be segments of the signature, which may be recognized as the traces extending between a point at which the pen is applied to the paper and the subsequent point at which it is lifted off. These features are easily recognized by visual inspection of a completed signature, while there are others which can be only detected when the actual writing of the signature is monitored in real time. Such features include velocities and accelerations of the pen, which may be measured in the horizontal X direction and the vertical Y direction, or in the resultant direction of pen movement. It is also possible, when monitoring the writing of a signature in real time, to take note of the times at which distinctive features such as pen-ups, pen-downs, turning points are reached to derive appropriate weighted and normalized parameters based on these measurements. One drawback with the above described invention, resides in the fact that the way to obtain very significant features is not described in this patent.

Also known in the art, there is the U.S. Pat. No. 3,962,679 of Rudolf Succo ENGELBRECHT, granted on June 8, 1976, in which there is described a handwriting identification system comprising a handwriting speed transducer for directly generating a single analogue signal proportional to the instantaneous speed of any given handwriting, wherein said speed is a scalar magnitude independent of the direction of said given handwriting at that instant and has a quantitative value equal to:

$$\sqrt{(v_x)^2+(v_y)^2},$$

where $v_x$ and $v_y$ are respectively the horizontal and vertical velocity vectors. One drawback with this system resides in the fact that, again, this patent does not describe how to obtain other significant features in order to allow a very efficient system for verifying a signature.

An object of the present invention is to provide an apparatus and a method for digitizing and segmenting a handwriting movement, and provide significant parameters for eventually verifying and recognizing the handwriting movement.

SUMMARY OF THE INVENTION

According to the present invention there is provided an apparatus for digitizing and segmenting a handwriting movement, comprising:

an electrical transducer for generating three electrical digital position signals characterizing a trajectory of said handwriting movement, said transducer including a pencil provided with a point and an analog-to-digital tablet, said three signals being $D_x(t)$, $D_y(t)$ and $D_z(t)$, where $D_x(t)$ and $D_y(t)$ are respectively position signals according to X and Y axes of a cartesian reference with respect to time, and $D_z(t)$ is a discrete signal indicating whether or not said point is contacting said tablet;

means for low-pass filtering said $D_x(t)$ and $D_y(t)$ electrical signals;

means for deriving said $D_x(t)$ and $D_y(t)$ electrical signals by predetermined time and transfer functions for generating $V_x$ and $V_y$ electrical components which represent respectively speeds of said point according to X and Y axes of a cartesian reference; means for calculating $V_\sigma$ and $V_\theta 0$ values from said $V_x$ and $V_y$ values where:

$$V_\sigma = \sqrt{\|V_x\|^2 + \|V_y\|^2},$$

and $$V_\theta = \pm\cos^{-1}\left[\frac{V_x \cdot V_y}{\|V_x\| \cdot \|V_y\|}\right],$$

where $V_\theta$ has a sign determined by:

$$\text{sign} = \left[\sin^{-1}\left[\frac{V_x \times V_y}{\|V_x\| \cdot \|V_y\|}\right]\right]; \text{ and}$$

means for calculating handwritten components and handwritten strings, where each of said handwritten components is delimited by two successive liftings of said point along said trajectory, and each of said handwritten strings is delimited by two successive portions of said trajectory where said $V_\theta$ value is higher than a predetermined angular speed value and said $V_\sigma$ value is lower than a predetermined curvilinear speed value.

Also according to the present invention, there is provided a method for digitizing and segmenting a handwriting movement, comprising steps of:

generating three electrical digital position signals characterizing a trajectory of said handwriting movement, by means of a transducer including a pencil provided with a point and an analog-to-digital tablet, said three signals being $D_x(t)$, $D_y(t)$ and $D_z(t)$, where $D_x(t)$ and $D_y(t)$ are respectively position signals according to X and Y axes of a cartesian reference with respect to time, and $D_z(t)$ is a discrete signal indicating whether or not said point is contacting said tablet;

filtering said $D_x(t)$ and $D_y(t)$ electrical signals; and deriving said $D_x(t)$ and $D_y(t)$ electrical signals by predetermined time and transfer functions for generating $V_x$ and $V_y$ electrical components which represent respectively speeds of said point according to X and Y axes of a cartesian reference;

calculating $V_\sigma$ and $V_\theta$ values from said $V_x$ and $V_y$ values where:

$$V_\sigma = \sqrt{\|V_x\|^2 + \|V_y\|^2},$$

and $$V_\theta = \pm\cos^{-1}\left[\frac{V_x \cdot V_y}{\|V_x\| \cdot \|V_y\|}\right],$$

where $V_\theta$ has a sign determined by:

$$\text{sign} = \left[\sin^{-1}\left[\frac{V_x \times V_y}{\|V_x\| \cdot \|V_y\|}\right]\right]; \text{ and}$$

calculating handwritten components and handwritten strings, where each of said handwritten components is delimited by two successive liftings of said point along said trajectory, and each of said handwritten strings is delimited by two successive portions of said trajectory where said $V_\theta$ value is higher than a predetermined angular speed value and said $V_\sigma$ value is lower than a predetermined curvilinear speed value.

BRIEF DESCRIPTION OF THE DRAWINGS

FIG. 3 is a table illustrating the characteristics of two analog-to-digital tablets that can be used with the present invention;

FIG. 4 is a table illustrating the transmission format of the output of one of the analog-to-digital tablet presented in FIG. 3;

FIG. 5 is a table illustrating the transmission format of the output of the other analog-to-digital tablet presented in FIG. 3;

FIG. 12 is a diagram illustrating the cartesian speed $V_x$ of the movement shown on FIG. 6, versus time;

FIG. 13 is a diagram illustrating the cartesian speed $V_y$ of the movement shown on FIG. 6, versus time;

DETAILED DESCRIPTION OF THE DRAWINGS

The acquisition and the processing of data relating to a handwriting movement can be divided in two parts. The first part is concerned with acquisition, filtering and derivation of the data provided by the tablet, and the second part is concerned with pre-processing of the data obtained from the first part. The acquisition of the co-ordinates can be made from two different types of input devices. First, it can be provided from the tablet, and second it can be provided from the disc unit which contains data relating to the acquisition of previous movements. The processing of the data comprises the following operation: converting from a cartesian reference to an intrinsic reference, dynamic segmentation, extraction of simple dynamic parameters, and pre-processing of the image formed by the movement.

During the acquisition of a handwriting movement, the data transmitted by the tablet characterize the trajectory of the point of the pencil by means of a sampling. This sampling is done according to fixed frequency and resolution and with respect to a cartesian reference oriented in view of the positioning of the tablet. Also, the acquisition mode of the tablet is set to "proximity" as it will be explained in the description of FIG. 3.

Validation of the acquisition is done when the point of the pencil has moved along a minimal of 0.025 cms with an acquisition time superior to 0.5 second. It is essential to know the sampling frequency and the resolution of the tablet for each acquisition so that the signature can be properly classified. Different studies have shown that the frequency spectrum of a handwriting movement has a bandwidth of 0 to 20 Hz. Thus, a sampling frequency of at least 100 Hz would be sufficient.

Even if we use a resolution of 393.7×1/cm, it is necessary to filter the signal by a low-pass filter to reduce the acquisition noise. This low-pass filter should have a bandwidth of 20 to 50 Hz.

Figure 1:
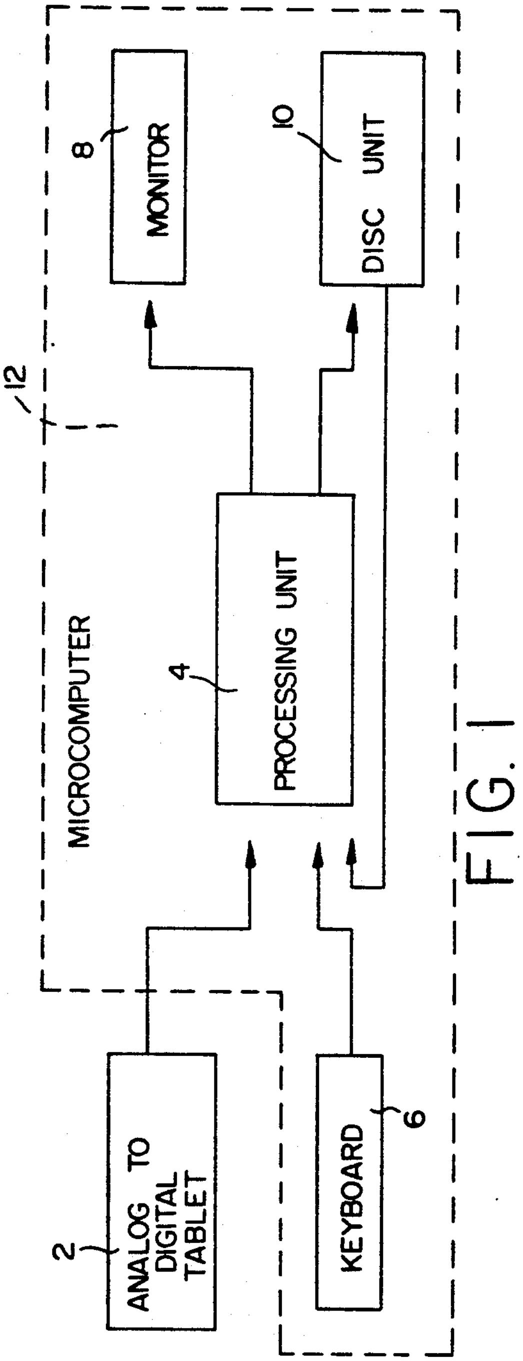
FIG. 1 is a schematic block diagram illustrating different elements of an apparatus for digitizing and segmenting a handwriting movement according to the present invention.

Referring now to FIG. 1, there is shown the apparatus for digitizing and segmenting a handwriting movement. This apparatus comprises an electrical transducer for generating three electrical digital positions signals characterizing a trajectory of the handwriting movement. The transducer includes a pencil (not shown) provided with a point and an analog-to-digital tablet 2. The three signals are $D_x(t)$, $D_y(t)$ and $D_z(t)$, where $D_x(t)$ and $D_y(t)$ are respectively position signals according to X and Y axes of a cartesian reference with respect to time, and $D_z(t)$ is a discrete signal indicating whether or not the point is contacting the tablet. The tablet 2 has a sampling frequency of 119.5 Hz and a resolution of 393.7 l/cm.

The apparatus also comprises means for low-pass filter having the $D_x(t)$ and $D_y(t)$ electrical signals, this means for low-pass filtering being performed by the processing unit 4. This means for low-pass filtering is a low-pass filter having a bandwidth of 20 to 50 Hz.

Figure 2:
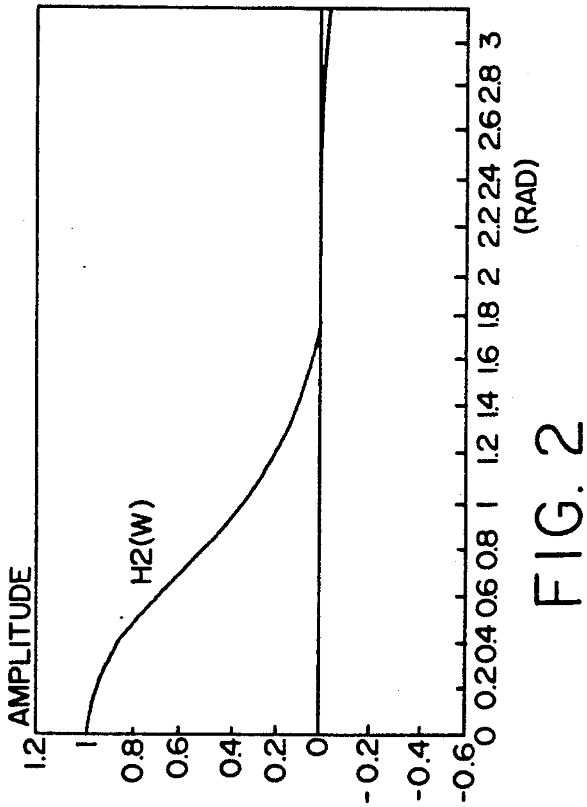
FIG. 2 is a diagram illustrating the frequency response of a low-pass filter that can be used in the present invention.

Referring now to FIG. 2, there is shown the low-pass filter which has been found preferable. This low-pass filter is of the GAUSSIAN type. The low-pass filter has a predetermined time function $F_2(t_i)$ where:

$$F_2(t_1) = \frac{F(t_{i-3}) + 3F(t_{i-2}) + 6F(t_{i+1}) + 7F(t_i) + 6F(t_{i+1})}{27} + \frac{3F(t_{i+2}) + F(t_{i+3})}{27};$$

This low-pass filter has also a predetermined transfer function $H_2(\omega)$ where:

$$H_2(\omega) = \frac{7 + 12\cos(\omega) + 6\cos(2\omega) + 2\cos(3\omega)}{27}$$

The present apparatus also comprises means for deriving the $D_x(t)$ and $D_y(t)$ electrical signals by predetermined time and transfer functions for generating $V_x$ and $V_y$ electrical components which represent respectively speeds of the point according to X and Y axes of a cartesian reference. This means for deriving being performed by the processing unit 4. Derivation allows the calculation of cartesian speeds from the cartesian coordinates that have been sampled. These speeds provide more information about the dynamic aspects of the signature. This means for deriving is a filter having a predetermined time function $F_5'(t_i)$ where:

$$F_5'(t_i) = \sum_{K=-N}^{N} C_K t_{i-K},$$

where $$C_K = \frac{\sin(\pi K/N)}{(\pi^2 K/N)}\left[\frac{\sin(K\omega_c)}{K^2} - \frac{\omega_c \cos(K\omega_c)}{K}\right]$$

and $N = 9$

This means for deriving has also a predetermined transfer function $H_5(\omega)$ where:

$$H_5(\omega) = 2\sum_{K=1}^{N} \frac{\sin(\pi K/N)}{\pi^2 K/N}\left[\frac{\sin(K\omega_c)}{K^2} - \frac{\omega_c \cos(K\omega_c)}{K}\right]\sin(K\omega),$$

where:

$$\omega_c = \frac{2\pi F_c}{F_s} \text{ and } N = 9,$$

$F_c$ is a cut-off frequency of 20 Hz, and $F_s$ is a sampling frequency of 100 Hz.

The apparatus also comprises means for calculating $V_\sigma$ and $V_\theta$ values from the $V_x$ and $V_y$ components where:

$$V_\sigma = \sqrt{||V_x||^2 + ||V_y||^2}, \text{ and}$$

$$V_\sigma = \sqrt{||V_x||^2 + ||V_y||^2},$$

-continued and $$V_\theta = \pm\cos^{-1}\left[\frac{V_x \times V_y}{||V_x|| \cdot ||V_y||}\right],$$

The sign of $V_\theta$ is determined by:

$$\text{sign} = \left[\sin^{-1}\left[\frac{V_x \cdot V_y}{||V_x|| \cdot ||V_y||}\right]\right]$$

The next step is the dynamic segmentation step which consists in calculating handwritten components and handwritten strings. In order to calculate these handwritten components and handwritten strings, four threshold values have to be set. The first of these threshold values is the predetermined angular speed value which is preferably 50 rad/s. The second of these values is the predetermined curvilinear speed value which is preferably $\overline{V}_\sigma/2$ cm/s., where $\overline{V}_\sigma$ is the average curvilinear speed of the pencil point during the trajectory. The third of these values is the minimal period of time of a handwritten string which is preferably 0.05 s. The fourth of these values is the minimal period of time of a lifting of the pencil point which is preferably 0,03 s.

To this effect, the apparatus also comprises means for calculating handwritten components and handwritten strings where each of the handwritten components is delimited by two successive liftings of the point along the trajectory of the movement, and each of the handwritten strings is delimited by two successive portions of the trajectory of the movement where the $V_\theta$ value is higher than a predetermined angular speed value and the $V_\sigma$ value is lower than a predetermined curvilinear speed value. This means for calculating is performed by the processing unit 4. Preferably, the predetermined angular speed is 50 rad/s., and the predetermined curvilinear speed is $\overline{V}_\sigma/2$ cm/s., where $\overline{V}_\sigma$ is an average curvilinear speed of the point during the trajectory.

The next step is the calculation of the simple dynamic parameters. These parameters allow a better classification of the movement. The percentages of the second, third and fourth dynamic parameters are normalized according to the duration of the whole duration of acquisition of a movement with liftings of the pencil point. The stops are characterized by a displacement inferior to a predetermined threshold value which can be preferably of 0.008 cms by sampling period. This means that the pencil point is considered as being immobile if the displacement speed is inferior to 0.8 cms/seconds. These threshold values have been fixed to the above-mentioned values because of the noise generated by the tablet. Of course, these threshold values can vary with the use of another tablet having different characteristics.

To this effect, the apparatus also comprises means for calculating, by means of the $D_z(t)$, a first simple dynamic parameter consisting of a period of time of the trajectory during which the point of the pencil is contacting the tablet 2; means for calculating, by means of $D_z(t)$, a second simple dynamic parameter consisting of a percentage representative of a period of time of the trajectory during which the point is lifted; means for calculating, by means of the $D_x(t)$, $D_y(t)$ and $D_z(t)$, a third simple dynamic parameter consisting of a percentage representative of a period of time of the trajectory during which the point is stopped; and means for calculating, by means of the $V_\theta$ value, a fourth simple dynamic parameter consisting of a percentage representative of a period of time of the trajectory during which the $V_\theta$ value is positive. All the above-mentioned means for calculating are performed by the processing unit 4.

The next step is concerned with the processing of the image formed by the trajectory of the movement. This processing of the image of the movement consists of a rotation of the trajectory according to its base line, and a normalization of the dimensions of the trajectory by a scaling. The rotation of the trajectory is needed to correct the effects of the orientation of the trajectory according to the cartesian reference of the tablet. The base line of a trajectory is estimated by establishing a straight line of regression applied to local minimums according to the Y cartesian axis. The straight line indicates the orientation of the trajectory with respect to the cartesian reference. A first rotation is made by applying a rotating operator to correct the inclination of the trajectory, and a second iteration is made so that the base line of the trajectory is aligned with a horizontal base line.

It has been noted that the dimensions of a specific type of handwriting movement of one person vary with a great magnitude from time to time. A normalization of the dimensions of the movement by means of a scaling can correct these variations. The dimensions of the normalized trajectories will be from 0 to 10,000 along the X cartesian axis, and have a value of 0 at the base line of the trajectory along the Y cartesian axis.

To this effect, the apparatus also comprises calculating means for applying respectively a first predetermined rotating operator and a second predetermined rotating operator to the $D_x(t)$ and $D_y(t)$ signals for correcting inclination of the trajectory and aligning a base line of the trajectory with a horizontal base line; and calculating means for scaling the $D_x(t)$ signal according to the X cartesian axis with values varying from 0 to 10,000 and for scaling the $D_y(t)$ according to the Y cartesian axis with a value of 0 when $D_y(t)$ signal crosses the base line of the trajectory. Again, all these calculating means are performed by the processing unit 4.

To complete this processing unit 4, there is provided a keyboard 6, a monitor 8 and a disc unit 10. The processing unit 4, the keyboard 6, the monitor 8 and the disc unit 10 form a microcomputer 12.

The analog-to-digital tablet 2 is of the electromagnetic type. This tablet 2 comprises a receiving surface and an emitting pencil (not shown) provided with a point detector and a command button. The function of this tablet 2 is to sample according to a constant frequency the handwriting movement of a user. The frequency of the tablet must be very stable to allow extraction of dynamic characteristics such as, for example, displacement speeds according to a cartesian reference.

The interface device forming the communication link between the tablet 2 and the microcomputer 10 is of the serial type. Accordingly, it is important to know the format of the output signal of the tablet 2. It has to be noted that this format is variable, thus allowing several modes of operation in which different parameters can be modified, such as the resolution of the tablet, the sampling frequency of the tablet, the transmission speed of the information generated by the tablet to the microprocessor, and the presence of parity.

The keyboard 6 is an input device comprising several control and alphanumeric keys. The keyboard allows a selection of different commands available with the possibility to enter personal information concerning the person under test. The keyboard associated with its serial controller can be of the IBM PC TM, AT, or extended type.

The monitor 8 is a video display allowing the display of the commands that are available, instructions and results associated with operations that have been performed. The display can be of the Monochrome Adapter, Color Graphic Adapter, Enhanced Graphic Adapter of Video Graphic Array type.

The disc unit 10 is of the magnetic type. This unit 10 allows the storage of the software as well as the different data associated with the system. The disc unit 10 has a minimum capacity of 2 to 10 Ko for one acquisition index. Each acquisition index includes the information relating to the previous acquisition of a movement by the same user. The disc unit 10 is connected to its controller in a regular manner known in the art.

The processing unit 4 allows the operation of the software. This operation can be divided in three parts. The first part is concerned with the control of the inputs which are provided by the tablet 2, the keyboard 6, and the disc unit 10.

The second part is concerned with the processing of the information itself. And the third part is concerned with the command outputs for the monitor 8 and the disc unit 10. The microprocessor of the processing unit is an INTEL 80286 or 80386 TM having an internal clock of at least 12 MHz. This microprocessor which constitutes the central microprocessor is connected to a mathematical processor which is an INTEL 80287 TM with a fast RAM memory (100 ns) and a serial port RS-232 for the connection of the tablet 2. The exploitation system for this microcomputer 12 is a MS-DOS Version 3.0 TM or a more recent version.

For example, the present system can be implemented with the following material: a central microprocessor 80286(12 MHz), an additional mathematical microprocessor 80287(8 MHz), a RAM memory of 512 Kb(100 ns), a serial port RS-232, an internal clock with a calendar, a keyboard of the IBM PC type TM, a hard disc of 20 Mb and its controller (80 ms), a monitor with a video controller Monochrome Adapter, a SUMMAGRAPHIC MM1201 TM or PENCEPT 300 tablet TM, and a MS-DOS Version 3.0 exploitation system.

The present system can be also implemented with the following material: central microprocessor 80386 (16 MHz), an additional mathematical microprocessor 80287(8 MHz), a RAM memory of 640 Kb+256 Kb (100 ns), two serial ports RS-232+one parallel port, internal calendar and clock, a keyboard of the extended type, a hard disc of 40 Mb and its controller (28 ms), a monitor with a video controller Enhanced Graphic Adapter, a SUMMAGRAPHIC MM1201 and PENCEPT 300 tablets, a MS-DOS Version 3.10 TM exploitation system, an C microsoft version 5.10 TM compiler, and a CODE EXPERT Version 1.1 TM software.

Among the different acquisition modes available, it has been decided to use the proximity acquisition mode, which means that the sampling and the transmission of the information from the tablet to the microcomputer 12 is done only if the position of the pencil point is below 2.5 cms of the surface of the tablet 2.

The present system can be used with two types of tablets which are the "SUMMAGRAPHIC MM1201" (Trade Mark) tablet and the "PENCEPT 300" (Trade Mark) tablet. These tablets have several characteristics, which comprise, among others, the proximity which is the maximal distance below which the information is considered valid, this distance being measured perpendicularly to the surface of the tablet: the precision which relates to the error associated with the difference of position between the measured position and the actual position of the pencil; the noise which relates to the error associated with fluctuations of position, measured during successive acquisition of the same position when the pencil is maintained at this position; and the constancy which relates to the error associated with the difference of position measured during the repetition of the same experience.

Figure 2A:
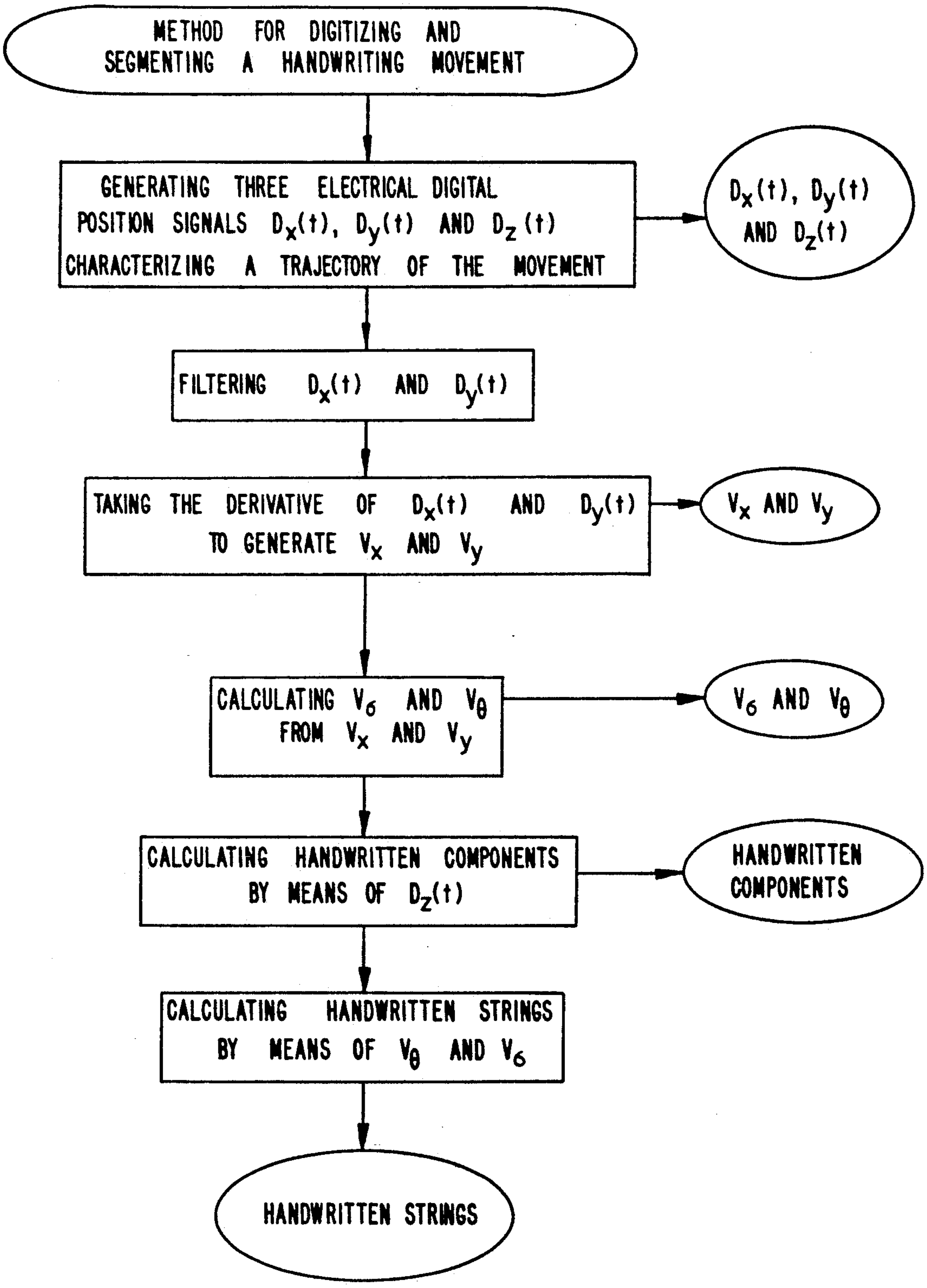
FIG. 2A is a flowchart illustrating the various steps of the method.

FIG. 2A is a flowchart illustrating the various steps of the method.

Referring now to FIG. 3, there are shown the principal characteristics of the "SUMMAGRAPHIC MM1201" and "PENCEPT 300" tablets in view of the characteristics discussed above.

Referring now to FIG. 4, there is shown the transmission format of the output of the "SUMMAGRAPHIC MM1201" tablet. The X13-X0 represents the X co-ordinates, where X0 is the least significant bit. The Y13-Y0 represents the Y co-ordinates where Y0 is the least significant bit. When DWN=1, this means that the point of the pencil is in a position to operate. When SID=1, this means that the command button of the pen has been pressed. When Prx=0, this means that the point of the pencil is out of the operative proximity, and when this value equals 1, this means that the point of the pencil is inside the operative proximity.

Referring now to FIG. 5, there is shown the transmission format of the "PENCEPT 300" tablet. The X13-X0 represent the X co-ordinates where X0 is the least significant bit, and the Y13-Y0 represents the Y co-ordinates where Y0 is the least significant bit. The Ax9-Ax0 represents the X angle where Ax0 is the least significant bit, and the Ay9-Ay0 represents the Y angle where Ay0 is the least significant bit, the value of 512 being representative of a vertical position.

The values of Dwn, Sid and Prx have the same meaning that the one described for the FIG. 4.

Figure 6:
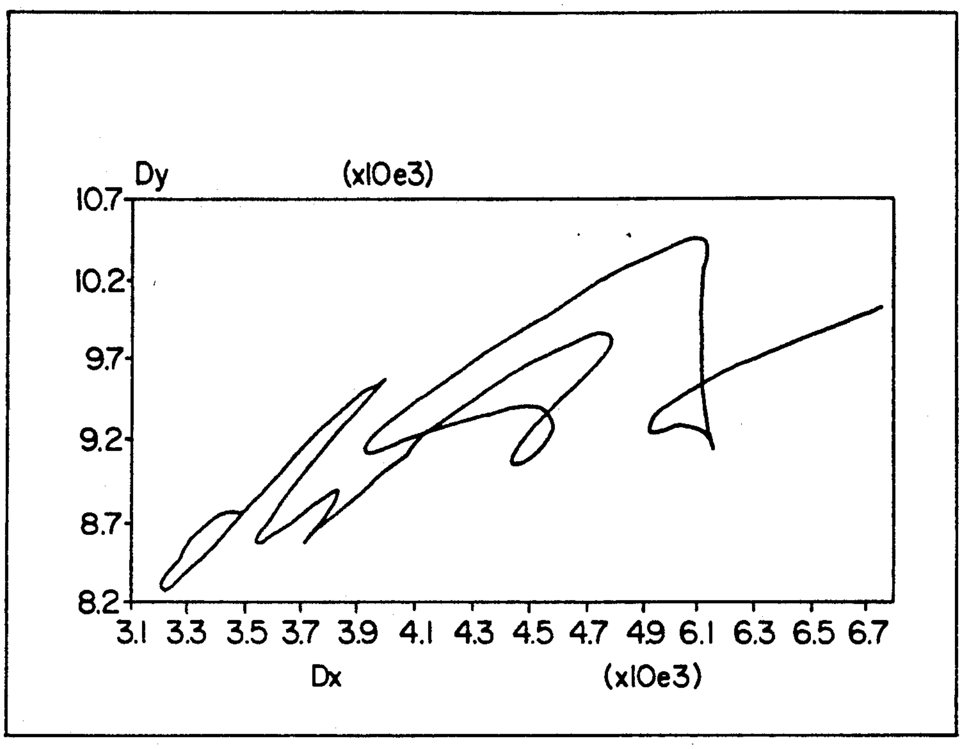
FIG. 6 is a diagram illustrating the trajectory of a movement after that it has been filtered.

Referring now to FIG. 6, there is shown a handwriting movement detected by the tablet and filtered by the low-pass filter of the GAUSSIAN type which has the frequency spectrum shown on FIG. 2. The X axis is representative of the Dx value, and the Y axis is representative of the Dy value. This movement has not been normalized.

Figure 7:
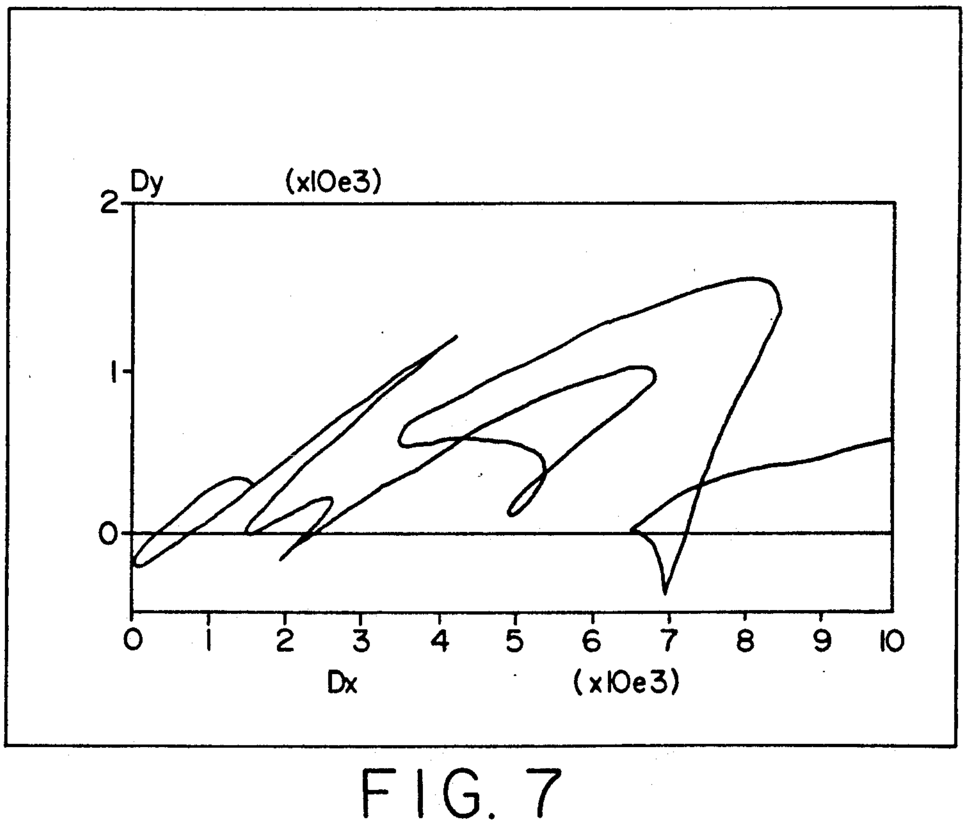
FIG. 7 is a diagram illustrating the trajectory of a movement after that it has been filtered and normalized.

Referring now to FIG. 7, there is shown the trajectory presented on FIG. 6 after that it has been normalized. As described earlier, this normalization consists of a rotation of the trajectory with a scaling.

Figure 8:
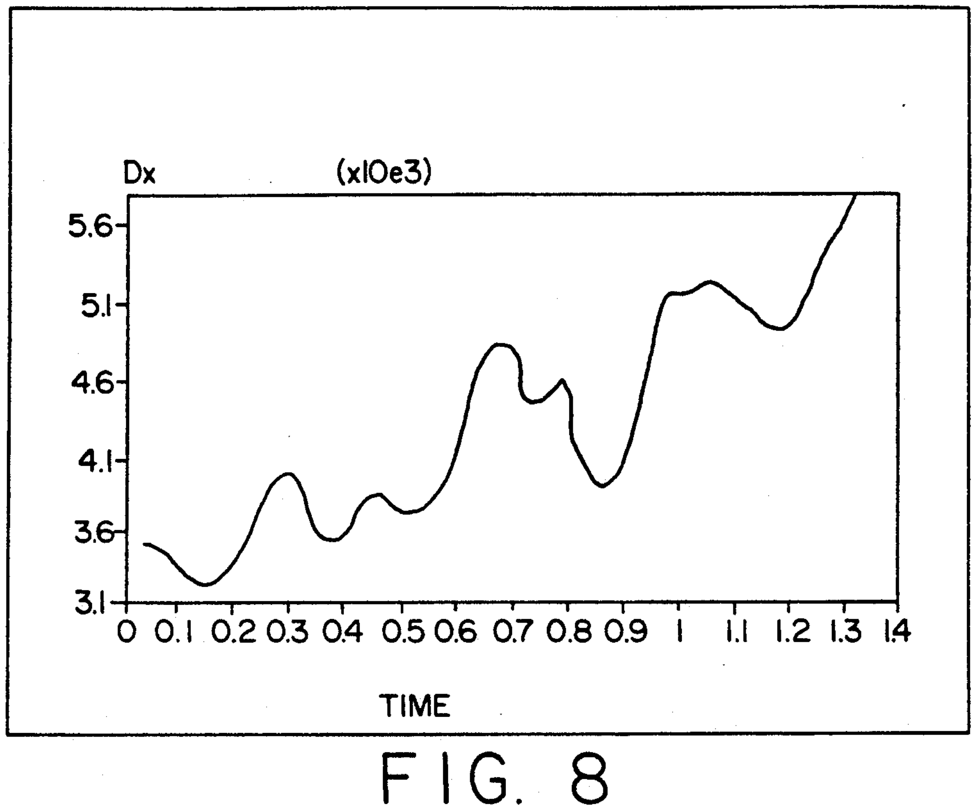
FIG. 8 is a diagram illustrating the displacement according to the X axis of the movement shown in FIG. 6, versus time.

Referring now to FIG. 8, there is shown the variations of the Dx value shown on FIG. 6, with respect to time.

Figure 9:
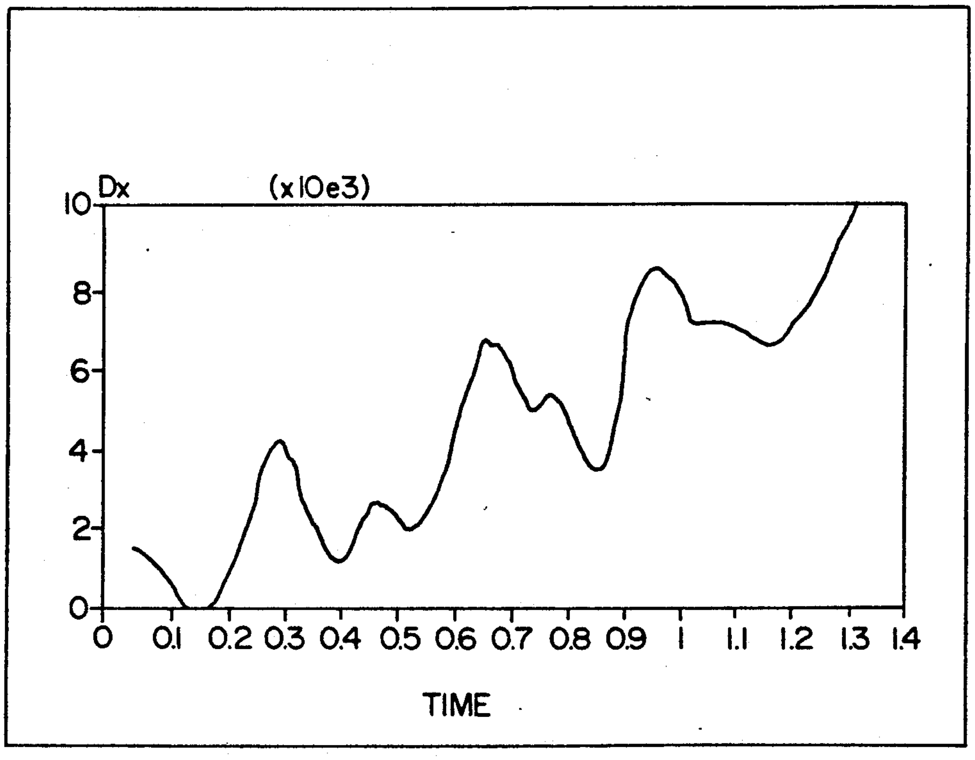
FIG. 9 is a diagram illustrating the displacement according to the X axis of the movement shown in FIG. 7, versus time.

Referring now to FIG. 9, there is shown the variations of Dx value shown on FIG. 7, with respect to time.

Figure 10:
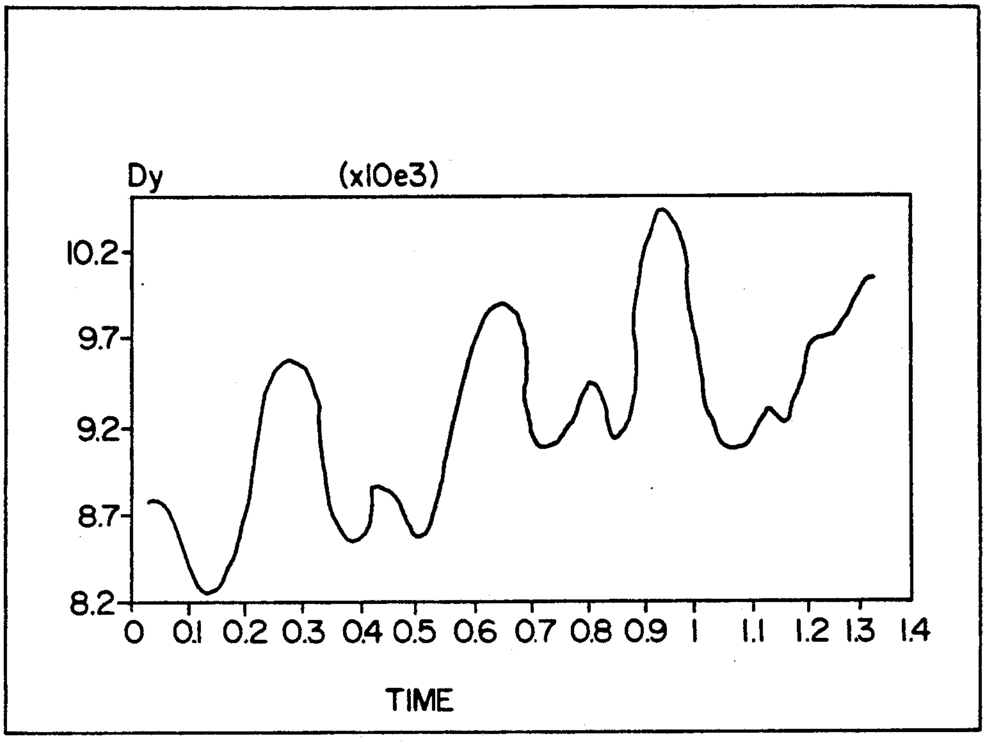
FIG. 10 is a diagram illustrating the displacement along the Y axis of the movement shown on FIG. 6, versus time.

Referring now to FIG. 10, there is shown the variations of Dy value of FIG. 6, with respect to time.

Figure 11:
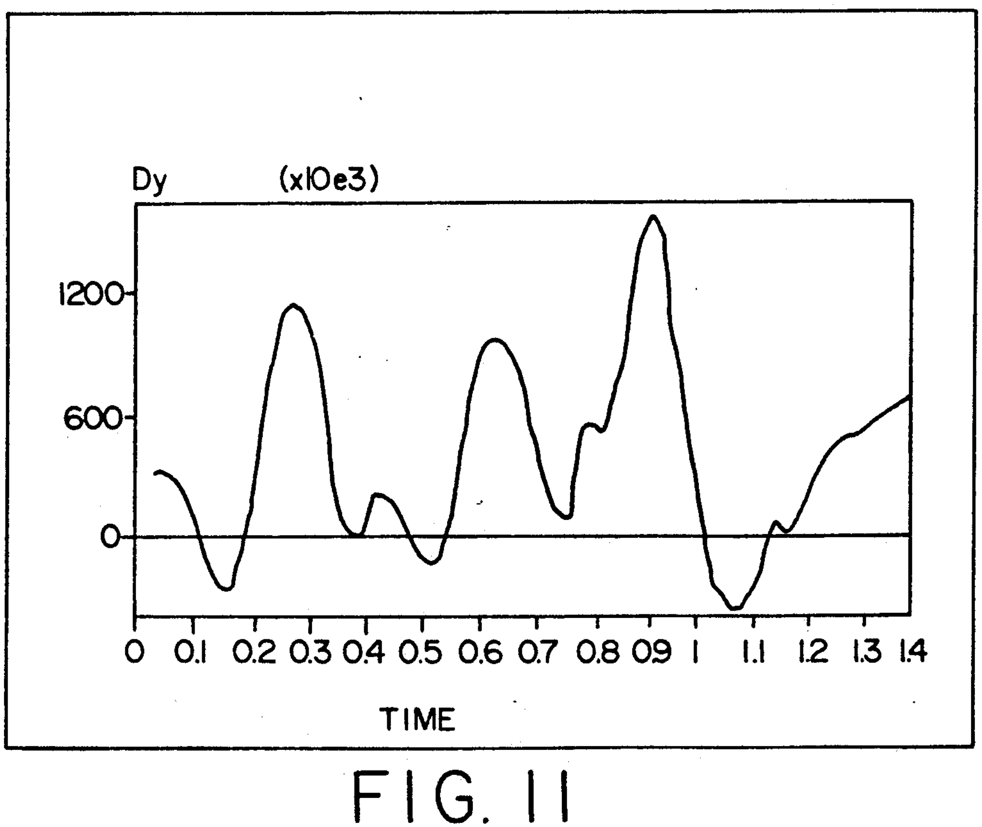
FIG. 11 is a diagram illustrating the displacement along the Y axis of the movement shown on FIG. 7, versus time.

Referring now to FIG. 11, there is shown the variations of Dy value of FIG. 7, with respect to time.

When comparing FIG. 10 and FIG. 11, it can be noted that there is an important variation of the value of Dy along the Y axis.

Referring now to FIG. 12, there is shown the cartesian speed Vx of the trajectory shown on FIG. 6, with respect to time. As explained earlier, this Vx is obtained by means of a derivation filter.

Referring now to FIG. 13, there is shown the cartesian speed Vy of the trajectory shown on FIG. 6, with respect to time.

Figure 14:
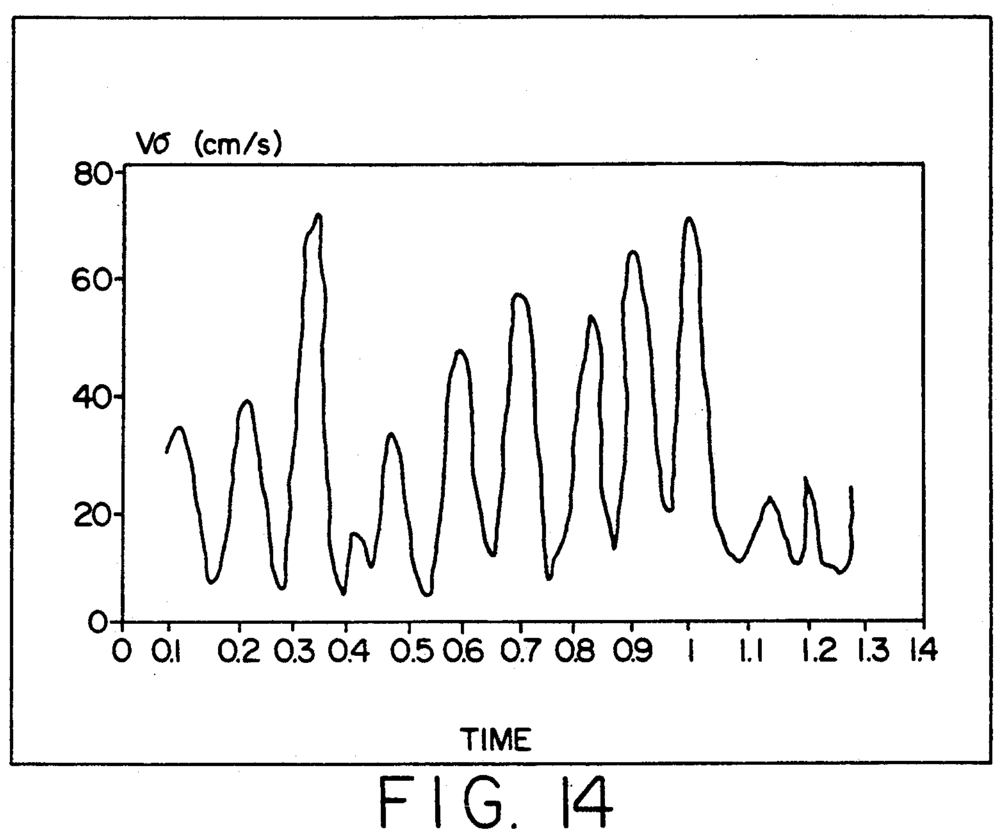
FIG. 14 is a diagram illustrating the curvilinear speed $V_\sigma$ of the movement shown on FIG. 6, versus time.

Referring now to FIG. 14, there is shown the curvilinear speed $V_\sigma$ of the trajectory shown on FIG. 6, with respect to time.

Figure 15:
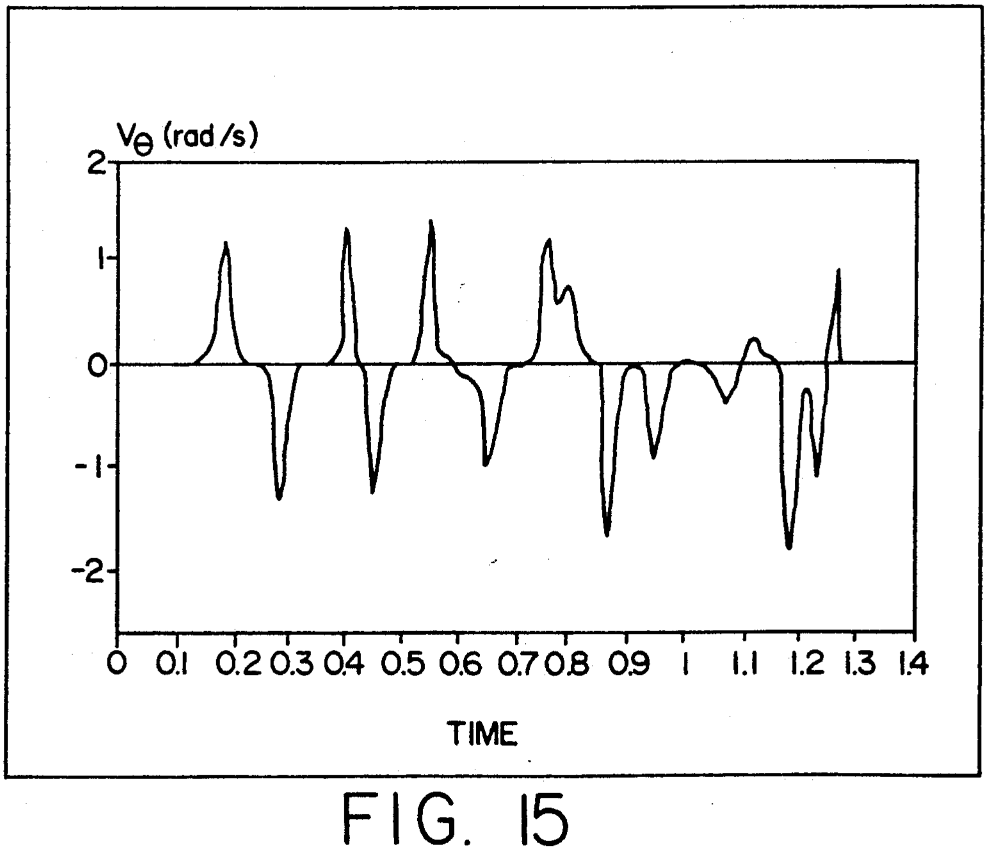
FIG. 15 is a diagram illustrating the angular speed $V_\theta$ movement shown on FIG. 6, versus time.

Referring now to FIG. 15, there is shown the angular speed $V_\theta$ of the trajectory shown on FIG. 6, with respect to time.

Figure 16:
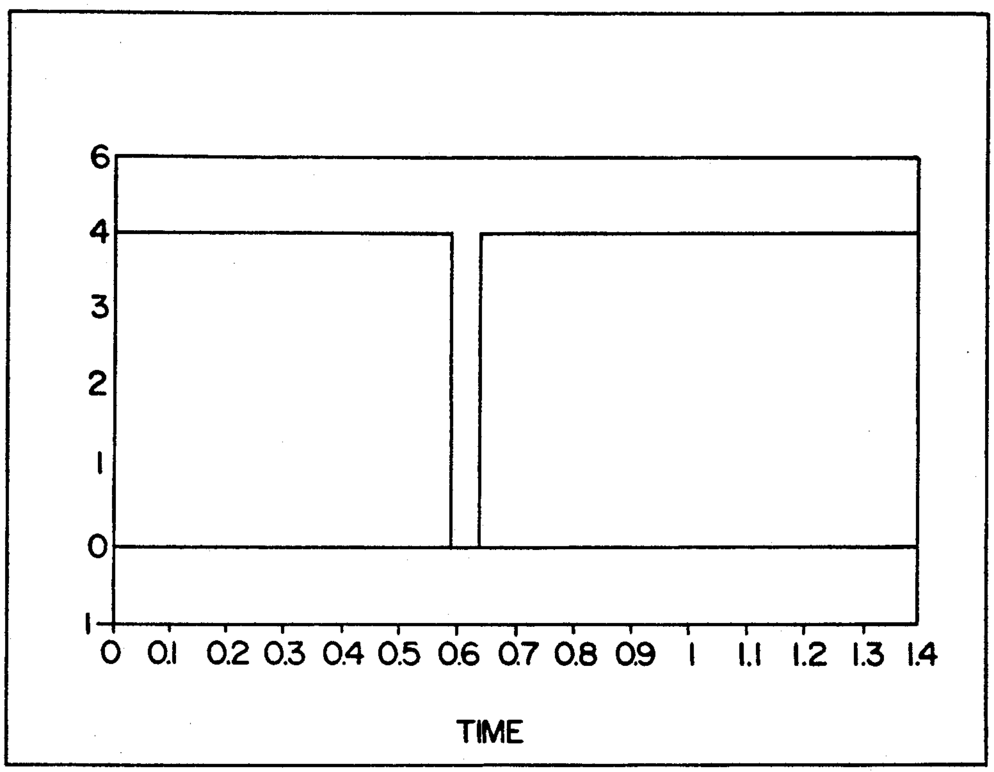
FIG. 16 is a diagram illustrating the signal representative of the lifting of the pen of the analog-to-digital tablet shown on FIG. 1.

Referring now to FIG. 16, there is shown an example of the signal indicating the state of the pencil point with respect to time. When the pencil point is contacting the tablet, the amplitude of the signal is equal to 4.

Figure 17:
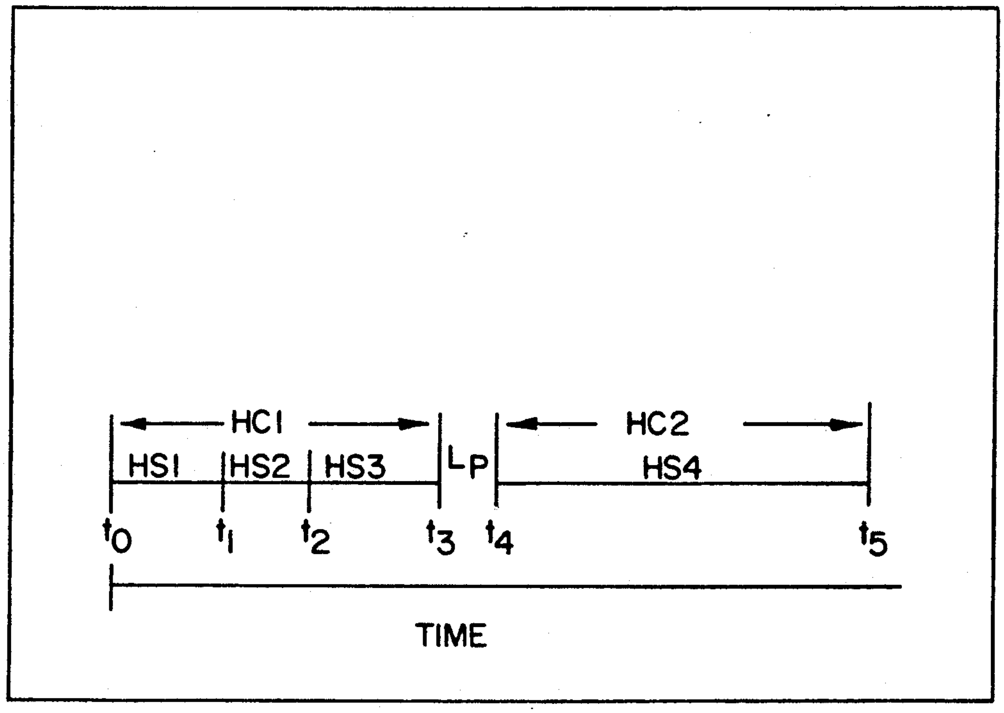
FIG. 17 is a diagram illustrating dynamic segmentation according to the present invention.

Referring now to FIG. 17, there is shown, as an example, the result of dynamic segmentation with respect to time. In this example, the trajectory has been divided in four handwritten strings HS1, HS2, HS3 and HS4, and two handwritten components HC1 and HC2. The handwritten components HC1 and HC2 are separated by a lifting of the pen Lp. The first handwritten component is composed of three handwritten strings HS1, HS2 and HS3 which occur at $T_1$, $T_2$ and $T_3$. The second handwritten component HC2 is constituted of only one handwritten string HS4 which occurs at $T_5$. These strings can be subdivided into subunits called strokes.

Figure 18:
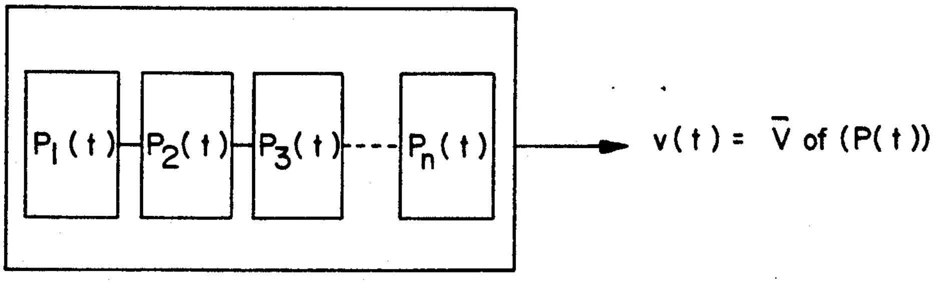
FIG. 18 is a diagram illustrating a general model of rapid-aimed movement.

A general way to look at the origin of the strokes of a movement is depicted in FIG. 18. The overall sets of neural and muscle networks involved in the generation of a single aimed-movement is assumed to result from the sequential actions of a set of n stochastic processes.

The internal description of these processing units is irrelevant to the model only their global statistical behavior is of interest. Some of them might be composed of neural networks, others of muscle fiber networks, some might incorporate internal feedback, etc. . . As long as they are in sufficient number, the theory holds. Assuming the ideal output for such a system to be a mean velocity $\overline{V}$ that would result in a displacement D when applied for a time interval $(t_1 - t_0)$:

$$D = \overline{V}(t_1 - t_0) \quad (1)$$

one can then consider the real output v(t) to reflect the total probability P(t) of having produced such an ideal output in a given time interval. In this context, one can write:

$$v(t) = \overline{V} f(P(t)) \quad (2)$$

where f(P(t)) is the probability density function of P(t).

If one assumes that all these processes are independent, in a sense that the jth subsystem does not load down the jth−1, the probability P(t) of producing a specific velocity at a given time will be the product of the probabilities $p_i(t)$ that each subsystem produces the proper response during that specific time interval:

$$P(t) = \prod_{i=1}^{n} p_i(t) \quad (3)$$

By taking the natural logarithm of this product, $$\ln P(t) = \sum_{i=1}^{n} \ln p_i(t) \tag{4}$$

and assuming that the density function of each $p_i(t)$ satisfies the weak condition of having a finite variance, then, if n is large, the central-limit theorem applies. The probability density function of ln P(t) is thus normally distributed around its mean with a variance and P(t) is distributed according to a log-normal density function:

$$f(P(t)) = \frac{1}{\sigma\sqrt{2\pi}\,P(t)} \exp -\left\{ [(\ln P(t) - \mu)]^2 \cdot \frac{1}{2\sigma^2} \right\} \tag{5}$$

If one assumes that P(t) increases linearly with time, up to a certain limit $t_1$:

$$P(t) = \frac{t - t_0}{t_1 - t_0}, \text{ for } t_0 \leqq t \leqq t_1 \tag{6}$$

where $t_0$=time when the probability of having produced $\overline{V}$ starts increasing from 0 (initiation time of the system)

$t_1$=time when the probability of having produced $\overline{V}$ is equal to 1 (termination time), that is: $t_1 - t_0$=*stroke duration,* then, by combining the equations (5), (6) and (2), one obtains a mathematical description for the velocity profiles:

$$v(t) = \frac{V(t_1 - t_0)}{\sigma\sqrt{2\pi}\,(t - t_0)} \exp -\left\{ \left[ \ln\left(\frac{t - t_0}{t_1 - t_0}\right) - \mu \right]^2 \cdot \frac{1}{2\sigma^2} \right\} \tag{7}$$

Figure 19:
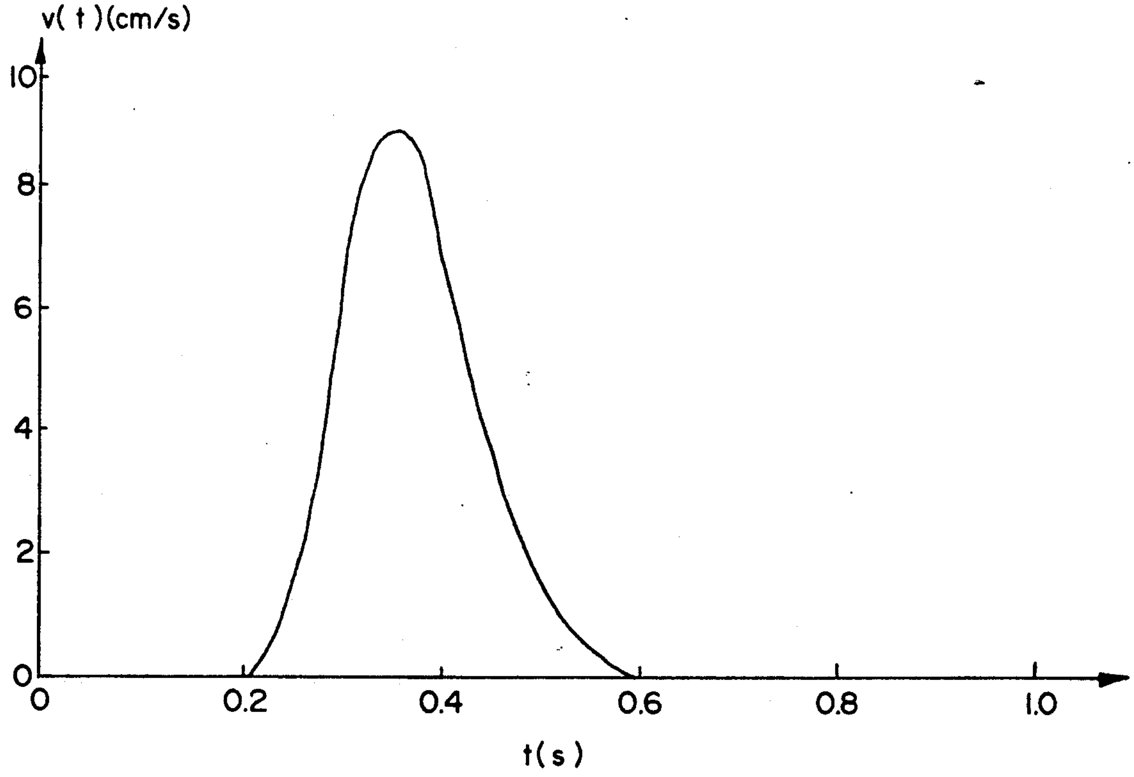
FIG. 19 is a log-normal velocity profile v(t) versus time.

Equation (7) constitutes a mathematical description of an asymmetric bell-shaped velocity profile where the shape of the profile can be theoretically affected by five parameters: V, $t_0$, $t_1$, $\mu$ and $\sigma$. These parameters can be easily combined to rescale the velocity profiles under different changes of experimental conditions, keeping the general appearance of the profile invariant under these conditions. The following parameter values were used in the bell-shaped velocity profile shown on FIG. 19: $\overline{V}$=2.0 cm/s; $t_0$=0.0s, $t_1$=1.0s, $\mu$=−1.0, $\sigma$=0.25.

A rapid-aimed movement described by a log-normal velocity profile can be seen as the fundamental unit of a learned movement or a stroke. Because of the direct relationship between the distance and some velocity control parameters, there is an equivalence between spatial and timing representation of movement through the log-normal velocity profile. More complex movements or strings can be planned and generated by summing up these bell-shaped velocity profiles. This immediately suggests two types of execution processes: an anticipation process, where complex velocity profiles can be described in terms of superimposed log-normal curves and a correction process where velocity can be reproduced by concatenating log-normal curves without superimposition.

The asymmetric bell-shaped velocity profiles result from the global stochastical behavior of the large number of processes involved in the velocity control, in other words the invariance of these profiles can be interpreted as resulting from the global self-organization of the system. In the same context, it is shown that the previously reported relationship between movement time and spatial or timing accuracy are no conflicting observations of different independent phenomena but results from the intrinsic properties of the log-normal velocity profiles.

Asymmetric bellshaped velocity profiles described by log-normal can be used as fundamental units or strokes for representing a handwriting movement. Accordingly, the curvilinear speed $V_\sigma$ and the angular speed $V_\theta$ along the trajectory of a handwriting movement can be represented by asymmetric bell-shaped curvilinear velocity profiles $v_\sigma(t)$ (curvilinear strokes) and asymmetric bell-shaped angular velocity profiles $v_\theta(t)$ (angular strokes) respectively.

By means of the processing unit 4, the following parameter values: $\overline{V}_\sigma$, $t_{0\sigma}$, $t_{1\sigma}$, $\mu_\sigma$ and $\sigma_\sigma$ are calculated so that $v_\sigma(t)$ matches with the $V_\sigma$ values along the trajectory of the handwriting movement where:

$$v_\sigma(t) = \frac{V_\sigma(t_{1\sigma} - t_{0\sigma})}{\sigma_\sigma\sqrt{2\pi}\,(t - t_{0\sigma})} \exp -\left\{ \left[ \ln\left(\frac{t - t_{0\sigma}}{t_{1\sigma} - t_{0\sigma}}\right) - \mu_\sigma \right]^2 \cdot \frac{1}{2\sigma_\sigma^2} \right\}$$

Also, by means of the processing unit 4, the following parameter values $\overline{V}_\theta$, $t_{0\theta}$, $t_{1\theta}$, $\mu_\theta$ and $\sigma_\theta$ are calculated so that $v_\theta(t)$ matches with the $V_\theta$ values along the trajectory of the handwriting movement where:

$$v_\theta(t) = \frac{V_\theta(t_{1\theta} - t_{0\theta})}{\sigma_\theta\sqrt{2\pi}\,(t - t_{0\theta})} \exp -\left\{ \left[ \ln\left(\frac{t - t_{0\theta}}{t_{1\theta} - t_{0\theta}}\right) - \mu_\theta \right]^2 \cdot \frac{1}{2\sigma_\theta^2} \right\}$$

An approximate model by means of $v_\sigma(t)$ and $v_\theta(t)$ offers an advantage for data compression since only a few parameter values are needed for characterizing the trajectory of a handwriting stroke. Accordingly, the microcomputer 12 comprises a memory for registering the parameter values $\overline{V}_\sigma$, $t_{0\sigma}$, $t_{1\sigma}$, $\mu_\sigma$, $\sigma_\sigma$, $\overline{V}_\theta$, $t_{0\theta}$, $t_{1\theta}$, $\mu_\theta$ and $\sigma_\theta$ whereby said handwriting movement is memorized and data compression is achieved.

As previously noted, the data processing of the present method for digitizing and segmenting a handwriting movement is performed by the processing unit which operates according to a proper programming stored in the disc unit 10. A set of programs have been written to perform this task for use with the computer equipment previously described.

The following brief description of these programs follows before an explicit listing of the actual program statements:

/*Listing file vds.h*/: defines and initializes different variables, parameters and procedures that are used in the other programs;

/*Listing file vds.c*/: registers a user;

/*Listing abonne.c*/: presents the results obtained after digitizing and segmenting of a handwriting movement;

/*Listing file acqui.c*/: performs all the data processing necessary for digitizing and segmenting a handwriting movement.

```
/* Listing -> file vds.h */

#include <stdio.h>
#include <stdlib.h>
#include <malloc.h>
#include <math.h>
#include <dos.h>
#include <conio.h>
#include <time.h>
#include <direct.h>
#include <string.h>
#include <io.h>

typedef int Ch_car[200][2];
#define NB_CH_MAX 100
#define NB_PT_MAX 1000

/* verifi.c */
extern void ver_sign(struct BANQUE *);
extern struct RESULTAT *verifie(struct BANQUE *,struct FA *);
extern void var_param_sp(struct SIG *,struct SIG *,struct RESULTAT *);
extern void corr_segm(struct SIG *,struct SIG *,Ch_car,Ch_car);
extern double cor_reg_sig(struct SIG *,struct SIG *,Ch_car,Ch_car,int);
extern double cor_reg_ch(double *,double *,int,int,double);
extern void pd_comp(int [100][3],int [100][3],int [100][2],double);
extern double pd_im_sig(struct SIG *,struct SIG *,Ch_car,Ch_car);
extern double pd_im_ch(float  [2][1000],float  [2][1000],int,int);

/* acqui.c */
extern struct SIG *acqui_sig(int,struct FA *);
extern int acquisition(int,struct SIG *,struct FA *);
extern void conver(struct SIG *);
extern void seg_dyn(struct SIG *);
extern void param_sp(struct SIG *);
extern void pretraite_i(struct SIG *);
extern void filtre(int,double [NB_PT_MAX][2],struct SIG *);
extern void derive(int,double [NB_PT_MAX][2],struct SIG *);
extern int synchronise(int,int *,int *,int *);
extern void acqui_coor(int,int *,int *,int *,int *);
extern int recoie(void);
extern double var_angle(double *,double *);
extern int reg_lin(double [100][2],int,double *,double *);

/* abonne.c */
extern void abonne(struct BANQUE *);
extern struct ETIQ *lect_etiq(struct BANQUE *);
extern void ecri_etiq(struct ETIQ *,struct BANQUE *);
extern void ecri_ref(struct SIG *,struct BANQUE *);
extern struct SIG *lect_ref(struct BANQUE *);

/* vds.c */
extern void main(int,char *[]);
extern void init_coml(int);
extern void transmet(int);
extern void prebanque(struct BANQUE *);
```

```
/* lib.c */
extern void efface(void);
extern void cadre(void);
extern void delai(double);
extern int acceptation(void);
extern void cls(void);

#define CARRE(x)     (float)((x)*(x))
#define sign(x)  ((x) > 0 ? 1 : ((x) == 0 ? 0 : (-1)))
#define PI 3.141592653
#define ESC       27
#define RETURN    13
#define HAUT      72
#define BAS       80
#define GAUCHE    75
#define DROITE    77
#define PAUSE  (printf("\nPRESSER UNE TOUCHE");bdos(1,0,0);)
#define VRAI   0xffff
#define FAUX   0
#define KFILTRE 3
#define X       0
#define Y       1
#define CURVI   0
#define ANG     1
#define XMIN    0
#define XMAX    1
#define YMIN    2
#define YMAX    3
#define MIN     0
#define MAX     1
#define PENCEPT '1'
#define SUMMA   '2'
#define TEST    1
#define REF     0
#define DIAG_BAS  0
#define DIAG_HAUT 1
#define DIAG_OBLIQUE 2
#define FICHIER  3
#define OUI      1
#define NON      0
#define NO_OP    9
#define ESC      27
#define NB_MAX_ABONNE 100
#define NB_PT_CH      100
struct BANQUE {
      char fichier[80];
      char reperto[60];
      char source[3];
      char ext[4];
      int nb_abonne;
      int nip_ref;
      };
struct ETIQ {
      char etat;
      char nb_sig;
      char nom[30];
      char date[9];
      char heure[9];
      float SDtot;
      float SDlv;
      float SDar;
      float SDap;
```

```
        float SCVs;
        float SCVt;
        float SDpd;
        };
struct SIG{
        struct{
                float cc[2];
                float vc[2];
                float vi[2];
                int   pointe;
                } dyn[NB_PT_MAX];
        struct{
                int   nb_point;
                int   nb_chaine;
                int   nb_composante;
                float vit_moy;
                float Dtot;
                float Dar;
                float Dlv;
                float Dap;
                } info;
        int ch[NB_CH_MAX][2];
        };
struct RESULTAT{
        struct{
                float VDtot;
                float VDlv;
                float VDar;
                float VDap;
                float s[3][4];
                int niveau[4];
                float cout;
                } a;
        struct{
                float CVs;
                float CVt;
                float s[3][2];
                float cout;
                } b;
        struct{
                float Dpd;
                float s[3];
                float cout;
                } c;
        int niveau[5];
        char essai;
        float duree;
        float cout;
        };
struct ERREUR{
        struct{
                char type1;
                char type2;
                char type3;
                }d;
        int usager;
        float t1[8][15];
        float t2[8][15];
        float t3[8][15];
        float g1[3][15];
        int t1_nb;
        int t2_nb;
        int t3_nb;
```

```
        int gl_t1_nb;
        int gl_t2_nb;
        int gl_t3_nb;
        };
struct FA{
        int n_sig;
        int n_imi;
        int n_essai;
        char fich[80];
        char source[60];
        };
#define DEBUG                0x01    /*0000 0001*/
#define ASCII                0x02    /*0000 0010*/
#define GRAPHIQUE            0x04    /*0000 0100*/
#define TEMPS_REEL           0x10    /*0000 0000*/
#define TEMPS_REEL_P         0x20    /*0100 0000*/
#define TEMPS_DIFFERE        0x40    /*1000 0000*/
#define TEMPS_DIFFERE_P      0x80    /*1100 0000*/
#define VIT_CUR         0
#define VIT_ANG         1
#define NB_POINT        2
#define ECHEC          'F'
#define SUCCES         'S'
#define REJETEE        'R'
#define S_NB_POINT      5.0
#define S_VIT_CURVI     5.0
#define S_VIT_ANG       1.0
#define VERTICAL        1
#define HORIZONTAL      2
#define DIAGONAL        3

#define LF_PB           3
#define LF_FD           8

#define REJET       0
#define ACCEPT      1
#define EQUIL       2
/* Listing -> file vds.c */

#include "vds.h"
int faute = FAUX;
int tab_num;
int ve[10];
char mode_vds;

void main(argc,argv)
int   argc;
char *argv[];
{
struct BANQUE Bs;
int            i;
int            choix;
int            sortie;
char           Ligne[80];
char           Commande_DOS[80];
FILE          *Ptr;
{
i = 1;
if(argc >= 2 ){
   for(;;){
      if(i >= argc)break;
      if(!strcmp(argv[i],"d") || !strcmp(argv[i],"D")){
```

```
            mode_vds |= DEBUG;
            }
        else if(!strcmp(argv[i],"g") || !strcmp(argv[i],"G")){
            mode_vds |= GRAPHIQUE;
            }
        else if(!strcmp(argv[i],"asc") || !strcmp(argv[i],"ASC")){
            mode_vds |= ASCII;
            }
        else if(!strcmp(argv[i],"auto+") || !strcmp(argv[i],"AUTO+")){
            mode_vds |= TEMPS_DIFFERE_P;
            }
        else if(!strcmp(argv[i],"auto") || !strcmp(argv[i],"AUTO")){
            mode_vds |= TEMPS_DIFFERE;
            }
        i++;
        }
    }
}
if((mode_vds & TEMPS_DIFFERE_P) || (mode_vds & TEMPS_DIFFERE)){
{
    if((Ptr = fopen("protoc.tdi","r")) == NULL){
        printf("Erreur a l'ouverture du fichier PROTOC.TDI\n");
        exit(1);
        }
    fgets(Ligne,80,Ptr);
    sscanf(Ligne,"%s",Bs.source);
    fgets(Ligne,80,Ptr);
    sscanf(Ligne,"%s",Bs.ext);
    fgets(Ligne,80,Ptr);
    sscanf(Ligne,"%s",Bs.reperto);
    i = 0;
    for(;;){
        if(i > 9)break;
        fgets(Ligne,80,Ptr);
        sscanf(Ligne,"%d",&ve[i]);
        ++i;
        }
    fclose(Ptr);
    cls();
    sprintf(Bs.fichier,"%sbanque.%s\0",Bs.reperto,Bs.ext);
}
    if((mode_vds & TEMPS_DIFFERE_P)){
{
        sprintf(Commande_DOS,"del %s\0",Bs.fichier);
        system(Commande_DOS);
        sprintf(Commande_DOS,"del *.cor\0");
        system(Commande_DOS);
        prebanque(&Bs);
        Bs.nb_abonne = ve[1];
        abonne(&Bs);
        printf("OK\n");
}
        }
{
    if(access(Bs.fichier,0) == -1){
        prebanque(&Bs);
        exit(1);
        }
    ver_sign(&Bs);
}
    }
else{
{
```

```
printf("\033[0m\033[2J\033[1m");
i = 1;
for(;;){
   if(i > 2)break;
   printf("═════════════════════════════════════════");
   printf("═════════════════════════════════════════\033[24;1H");
   ++i;
   }
printf("╚\033[1;1H╔\033[1;80H╗\033[24;80H╝\033[2;1H");
i = 2;
for(;;){
   if(i > 23)break;
   printf("║\033[%d;80H║",i);
   ++i;
   }
printf("\033[3;21H\033[4m");
printf("LOGICIEL DE VERIFICATION DE SIGNATURE");
printf("\033[0m\033[4;34H");
printf("Version 3.0");
printf("\033[1m\033[6;25HDEPARTEMENT DE GENIE ELECTRIQUE");
printf("\033[11;10H\033[0m");
printf("Programmeur:  Louis Brassard  (automne 1984)");
printf("\033[12;10H(version TI-FS990/4)");
printf("\033[14;10HRevisé et modifié par:  Jean Beaudoin  (hiver 1987)");
printf("\033[15;10H(version IBM-PC et compatibles)")         ;
printf("\033[17;10HRevisé et amélioré par:  Jean Beaudoin et Alain \
Gladu  (été 1987)");
printf("\033[18;10H(version COMPAQ 386)");
printf("\033[7m\033[22;23H Presser une touche pour continuer");
printf("\033[0m");
bdos(1,0,0);
printf("\033[0m");
printf("\033[6;25H                              ");
printf("\033[11;10H");
printf("                                          ");
printf("\033[12;10H                    ");
printf("\033[14;10H                                                    ");
printf("\033[15;10H                              ")                    ;
printf("\033[17;10H                                                   \
        ");
printf("\033[18;10H                    ")                    ;
printf("\033[22;23H                                  ");
}
{
   if((Ptr = fopen("protoc.tre","r")) == NULL){
      printf("Erreur a l'ouverture du fichier PROTOC.TRE\n");
      exit(1);
      }
   fgets(Ligne,80,Ptr);
   sscanf(Ligne,"%s",Bs.source);
   fgets(Ligne,80,Ptr);
   sscanf(Ligne,"%s",Bs.ext);
   fgets(Ligne,80,Ptr);
   sscanf(Ligne,"%s",Bs.reperto);
   fgets(Ligne,80,Ptr);
   sscanf(Ligne,"%d",&tab_num);
   fclose(Ptr);
   sprintf(Bs.fichier,"%sbanque.%s\0",Bs.reperto,Bs.ext);
   if(access(Bs.fichier,0) == -1){
      prebanque(&Bs);
      }
}
```

```
{
   sortie = FAUX;
   for(;;){
{
      choix = 0;
      cadre();
      printf("\033[1;4m\033[2;21H");
      printf("PROGRAMME DE VERIFICATION DE SIGNATURE\033[0;1m");
      printf("\033[4;1H╟══════════════════════════════════════════════");
      printf("═══════════════════════════════════════╢");
      printf("\033[1;3H %s ",Bs.fichier);
      printf("\033[0m\033[6;10H");
      printf("1)  Abonner un usager, ajouter des références, ");
      printf("activer un code");
      printf("\033[7;10H     sur l'usager");
      printf("\033[9;10H");
      printf("2)  Consulter les références de l'usager");
      printf("\033[12;10H3)  Désactiver un code, désabonner l'usager");
      printf("\033[15;10H4)  Vérifier la signature de l'usager");
      printf("\033[18;10H5)  Sortie du logiciel\033[0;1m");
      printf("\033[20;1H╟══════════════════════════════════════════════");
      printf("═══════════════════════════════════════╢");
      printf("\033[0;7m\033[22;5H Numéro de la commande:");
      printf("\033[0m ");
      choix = bdos(1,0,0) & 0xff;
}
      if(choix == '1'){
{
         efface();
         printf("\033[4;32H mode abonnement ");
         printf("\033[8;10H1. Abonner un usager au système");
         printf("\033[12;10H2. Ajouter des signatures de références");
         printf("\033[16;10H3. Réactiver le numéro d'un abonné");
         printf("\033[0;7m\033[22;5H Numéro de la commande:");
         printf("   \033[2D");
         printf("\033[0m ");
}
         for(;;){
            choix = bdos(1,0,0) & 0xff;
            if(choix == '1'){
               abonne(&Bs);
               break;}
            else{
{
               printf("\033[1m\033[22;5H");
               printf("COMMANDE INVALIDE\033[0m                              ");
               delai(1.0);
               printf("\033[0;7m\033[22;5H Numéro de la commande:");
               printf("\033[0m ");
}
               }
            }
         }
      else if(choix == '2'){
         }
      else if(choix == '3'){
         }
      else if(choix == '4'){

         ver_sign(&Bs);
         }
      else if(choix == '5'){
         sortie = VRAI;
```

```
        )
      else{
         printf("\033[1m\033[22;5H");
         printf("COMMANDE INVALIDE\033[0m                              ");
         delai(1.0);
         }
      if(sortie)break;
      }
   printf("\033[2J\033[1m\033[12;35HAU REVOIR !\033[0m\033[24;1H");
}
   }
}

void init_com1(Mode)
int Mode;
{
union REGS regs;
if(Mode == PENCEPT){
{
   regs.h.ah = 0x00;
   regs.h.al = 0xe3;
   regs.h.dh = 0x00;
   regs.h.dl = 0x00;
   int86(0x14,&regs,&regs);
   transmet(0x20);
   transmet(0x20);
}
   }
else if(Mode == SUMMA){
{
   regs.h.ah = 0x00;
   regs.h.al = 0xeb;
   regs.h.dh = 0x00;
   regs.h.dl = 0x00;
   int86(0x14,&regs,&regs);
   transmet(0x20);
   transmet(0x40);
   transmet(0x68);
   transmet(0x51);
}
   }
}

void prebanque(Bs)
struct BANQUE *Bs;
{
int    i;
int    Erreur=0;
char   Mess[55];
long   Decalage;
struct ETIQ Es;
FILE  *Ptr;
{
Es.etat = 0;
Es.SDtot =  (float)0.001;
Es.SDlv  =  (float)0.001;
Es.SDar  =  (float)0.001;
Es.SDap  =  (float)0.001;
Es.SCVs  =  (float)0.999;
Es.SCVt  =  (float)0.999;
Es.SDpd  =  (float)0.001;
}
if((Ptr = fopen(Bs->fichier,"w+b")) == NULL){
```

```
   Erreur = 1;
   }
sprintf(Mess,"Programmeur: Pierre Yergeau,Version 1.00,Mars 1988\0");
if(fwrite(Mess,50,1,Ptr) != 1 && !Erreur){
   Erreur = 2;
   }
if(fseek(Ptr,50L,SEEK_SET) != 0 && !Erreur){
   Erreur = 3;
   }
i = 0;
if(fwrite(&i,sizeof(int),1,Ptr) != 1){
   Erreur = 4;
   }
i = 1;
for(;;){
   if(i > NB_MAX_ABONNE)break;
   Decalage = (long)((i-1)*sizeof(struct ETIQ)+50L+sizeof(int));
   if(fseek(Ptr,Decalage,SEEK_SET) != 0 && !Erreur){
      Erreur = 5;
      }
   if(fwrite(&Es,sizeof(struct ETIQ),1,Ptr) != 1 && !Erreur){
      Erreur = 6;
      }
   ++i;
   }
if(Erreur){
   fprintf(stderr,"\nFonction: prebanque(), Erreur: %2d",Erreur);
   }
fclose(Ptr);
}

void transmet(Octet)
int Octet;
{
int Drapeau;
outp(0x3F8,Octet);
for(;;){
   Drapeau = inp(0x3FD);
   if(Drapeau & 0x20)break;
   }
}

/* Listing -> abonne.c */

#include "vds.h"
extern char mode_vds;
extern int tab_num;
extern int ve[];
char *ent_abonne[] = {
"╔══════════════════════════════════════════╗",
"║ Renseignements personnels de l'abonné    ║",
"╟──────────────────────────────────────────╢",
"║                                          ║",
"╚══════════════════════════════════════════╝",
"╔══════════════════════════════════════════╗",
"║ Valeurs des paramètres du 1er niveau     ║",
"╟──────────────────────────────────────────╢",
"║                                          ║",
"╚══════════════════════════════════════════╝",
```

```
"╔══════════════════════════════════════════════════════╗",
"║              Variations des paramètres               ║",
"╟──────────────────────────────────────────────────────╢",
"║              1%     1%     1%     1%    2%    2%   3 ║",
"╟────────┬──────┬─────┬─────┬─────┬─────┬─────┬───────╢",
"║ #Perm  │δDtot │δDar │δDlv │δDap │ CVs │ CVt │  Dpd  ║",
"╟────────┼──────┼─────┼─────┼─────┼─────┼─────┼───────╢",
"║        │      │     │     │     │     │     │       ║",
"╚════════╧══════╧═════╧═════╧═════╧═════╧═════╧═══════╝",
"╔══════════════════════════════════════════╗",
"║            Valeurs des seuils            ║",
"╟──────────────────────────────────────────╢",
"║ 1%     1%     1%     1%    2%    2%    3 ║",
"╟──────┬─────┬─────┬─────┬─────┬─────┬─────╢",
"║δDtot │δDar │δDlv │δDap │ CVs │ CVt │ Dpd ║",
"╟──────┼─────┼─────┼─────┼─────┼─────┼─────╢",
"║      │     │     │     │     │     │     ║",
"╚══════╧═════╧═════╧═════╧═════╧═════╧═════╝",
};

void abonne(Bs)
struct BANQUE   *Bs;
{
int     i;
int     j;
int     k;
int     n;
int     Rep;
int     Sortie;
int     Erreur=0;
int     Nb_sig;
float   Seuil[6][7];
char    commande[50];
char    Fich_ent[60];
struct FA         Fa;
struct BANQUE     Ba;
struct ETIQ      *Ea;
struct ETIQ      *Es;
struct SIG       *Sra;
struct RESULTAT *Re;
FILE  *Ptr;
{
sprintf(Ba.source,"ab");
sprintf(Ba.ext,"abt");
sprintf(Ba.reperto,"");
sprintf(Ba.fichier,"banque.abt");
prebanque(&Ba);
sprintf(Fa.source,"%s%s\0",Bs->reperto,Bs->source);
}
if((mode_vds & TEMPS_REEL)){
{
   Bs->nip_ref = 0;
   lect_etiq(Bs);
   if(Bs->nb_abonne == 0){
      Bs->nip_ref = 0;
      }
   else if(Bs->nb_abonne < (NB_MAX_ABONNE-1)){
      Bs->nip_ref = 0;
      Sortie = FAUX;
      for(;;){
         if((Es = lect_etiq(Bs)) == NULL){
            Erreur = 1;
            }
         else{
            if(!(Es->etat & 0x80)){
```

```
              Sortie = VRAI;
              }
           else{
              free(Es);
              ++Bs->nip_ref;
              }
           }
        if(Sortie || Erreur)break;
        }
     }
  else{
     efface();
     printf("\033[12;10H\033[1m");
     printf("LA CAPACITE MAXIMALE DE 100 ABONNES A ETE ATTEINTE.  ") ;
     printf("DESOLE ...");
     printf("\033[7m\033[22;5HPresser une touche pour continuer");
     printf("\033[0m");
     bdos(1,0,0);
     return;
     }
}
{
  efface();
  printf("\033[1m\033[6;32HNOUVEL ABONNEMENT\033[0m");
  printf("\033[9;10H1. Fournir les renseignements suivants:");
  printf("\033[11;20H- Nom et prénom:");
  printf("\033[13;20H- Date d'abonnement:");
  printf("\033[17;10H2. L'usager devra signer son nom 3 fois");
  printf("\033[22;5H\033[7m");
  printf(" Nom et prénom:                       \033[25D");
  fflush(stdin);
  for(;;){
     gets(Es->nom);
     if(strlen(Es->nom) > 0)break;
     }
  strupr(Es->nom);
  printf("\033[0m\033[11;38H%-26s",Es->nom);
  _strdate(Es->date);
  _strtime(Es->heure);
  printf("\033[0m\033[13;42H%-10s",Es->date);
  printf("\033[0m\033[22;5H                                    \
");
  printf("\033[7m\033[22;5HPresser une touche pour continuer       ");
  printf("\033[0m");
  bdos(1,0,0);
}
{
  Fa.n_sig = Fa.n_imi = Bs->nip_ref;
  Nb_sig = 1;
  for(;;){
     Fa.n_essai = Nb_sig;
     if((Sra = acqui_sig(tab_num,&Fa)) == NULL){
        Erreur = 2;
        }
     else{
        free(Sra);
        ++Nb_sig;
        }
     efface();
     printf("\033[23;16H(Presser ESC pour annuler la séance)");
     printf("\033[22;16H");
     printf("La signature est-elle valide ? (O/N): ");
     if((Rep = acceptation()) == 0){
```

```
   sprintf(commande,"del %s",Fa.fich);
   system(commande);
   }
if(Rep == ESC){
   efface();
   printf("\033[12;10H");
   printf("LE PROCESSUS D'ABONNEMENT A ETE INTERROMPU");
   printf("\033[14;10H");
   printf("L'abonnement est donc annulé !");
   printf("\033[16;10H");
   printf("Vous pouvez cependant faire une autre demande si vous");
   printf(" le desirez");
   free(Es);
      return;
      break;}
   if(Nb_sig == 4)break;
   }
   efface();
   printf("\033[12;10H");
   printf("LE PROCESSUS D'ABONNEMENT EST EN COURS D'OPERATION...");
   printf("\033[0m\033[22;5H                                               ");
   mode_vds |= (mode_vds & 0x0f) | TEMPS_REEL_P;
   ve[0] = ve[1] = Bs->nip_ref;
   ++Bs->nb_abonne;
}
   }
i = ve[0];
for(;;){
   if(i > ve[1])break;
   if(mode_vds & TEMPS_DIFFERE_P){
      printf("\n Abonnement -> usager #%3d",i);
      }
{
   Ba.nip_ref = 0;
   if((Ea = lect_etiq(&Ba)) == NULL){
      Erreur = 3;
      }
   _strdate(Ea->date);
   _strtime(Ea->heure);
   Ea->etat = 0xFF;
   Ea->nb_sig = 3;
   if(mode_vds & TEMPS_DIFFERE_P){
      sprintf(Ea->nom,"USAGER #%3d",i);
      }
   else{
      sprintf(Ea->nom,"%s",Es->nom);
      }
   j = 1;
   for(;;){
      if(j > 3)break;
      Ba.nip_ref = j;
      Fa.n_sig = Fa.n_imi = i;
      Fa.n_essai = j;
      if((Sra = acqui_sig(FICHIER,&Fa)) == NULL){
         Erreur = 4;
         }
      else{
         ecri_etiq(Ea,&Ba);
         free(Ea);
         ecri_ref(Sra,&Ba);
         free(Sra);
         ++j;
         }
      if(Erreur)break;
      }
```

```
   Ba.nb_abonne = 3.                  ;.
}
{
   n = 0;
   j = 1;
   for(;;){
      if(j > 3)break;
      k = 1;
      for(;;){
         if(k > 3)break;
         if(j != k){
            Ba.nip_ref = j;
            Fa.n_sig = Fa.n_imi = i;
            Fa.n_essai = k;
            Re = verifie(&Ba,&Fa);
            Seuil[n][0] = Re->a.VDtot;
            Seuil[n][1] = Re->a.VDlv;
            Seuil[n][2] = Re->a.VDar;
            Seuil[n][3] = Re->a.VDap;
            Seuil[n][4] = Re->b.CVs;
            Seuil[n][5] = Re->b.CVt;
            Seuil[n++][6] = Re->c.Dpd;
            free(Re);
            }
         ++k;
         }
      ++j;
      }
   Ba.nip_ref = i;
   if((Es = lect_etiq(&Ba)) == NULL){
      Erreur = 5;
      }
{
   Es->SDtot = Seuil[0][0];
   Es->SDlv  = Seuil[0][1];
   Es->SDar  = Seuil[0][2];
   Es->SDap  = Seuil[0][3];
   Es->SCVs  = Seuil[0][4];
   Es->SCVt  = Seuil[0][5];
   Es->SDpd  = Seuil[0][6];
   j = 1;
   for(;;){
      if(j == n)break;
      if(Es->SDtot < Seuil[j][0]){
         Es->SDtot = Seuil[j][0];
         }
      if(Es->SDlv < Seuil[j][1]){
         Es->SDlv = Seuil[j][1];
         }
      if(Es->SDar < Seuil[j][2]){
         Es->SDar = Seuil[j][2];
         }
      if(Es->SDap < Seuil[j][3]){
         Es->SDap = Seuil[j][3];
         }
      if(Es->SCVs > Seuil[j][4]){
         Es->SCVs = Seuil[j][4];
         }
      if(Es->SCVt > Seuil[j][5]){
         Es->SCVt = Seuil[j][5];
         }
      if(Es->SDpd < Seuil[j][6]){
         Es->SDpd = Seuil[j][6];
```

```
            }
        ++j;
        }
    }
}
{
    Es->etat = 0xFF;
    Ba.nip_ref = 1;
    if((Sra = lect_ref(&Ba)) == NULL){
        Erreur = 6;
        }
    else{
        Bs->nip_ref = i;
        ecri_etiq(Es,Bs);
        ecri_ref(Sra,Bs);
        }
}
{
    sprintf(Fich_ent,"%s%s___%02d.ent\0",Bs->reperto,Bs->ext,Bs->nip_ref);
    if((Ptr = fopen(Fich_ent,"w+")) == NULL){
        Erreur = 5;
        }
    fprintf(Ptr,"%s\n",ent_abonne[0]);
    fprintf(Ptr,"%s\n",ent_abonne[1]);
    fprintf(Ptr,"%s\n",ent_abonne[2]);
    fprintf(Ptr,"║Nom complet.......: %-20s║\n",Es->nom);
    fprintf(Ptr,"║Date d'abonnement.: %s                ║\n",Es->date);
    fprintf(Ptr,"║Heure d'abonnement: %s                ║\n",Es->heure);
    fprintf(Ptr,"%s\n",ent_abonne[4]);
    fprintf(Ptr,"%s\n",ent_abonne[5]);
    fprintf(Ptr,"%s\n",ent_abonne[6]);
    fprintf(Ptr,"%s\n",ent_abonne[7]);
    fprintf(Ptr,"║Durée sans levée de crayon: %5.2f s     ║\n",
                Sra->info.Dtot);
    fprintf(Ptr,"║Durée des temps d'arrêt...: %4.1f  %%     ║\n",
                Sra->info.Dar*100);
    fprintf(Ptr,"║Durée des levées de crayon: %4.1f  %%     ║\n",
                Sra->info.Dlv*100);
    fprintf(Ptr,"║Durée de la vit. ang. pos.: %4.1f  %%     ║\n",
                Sra->info.Dap*100);
    fprintf(Ptr,"%s\n",ent_abonne[9]);
    fprintf(Ptr,"%s\n",ent_abonne[10]);
    fprintf(Ptr,"%s\n",ent_abonne[11]);
    fprintf(Ptr,"%s\n",ent_abonne[12]);
    fprintf(Ptr,"%s\n",ent_abonne[13]);
    fprintf(Ptr,"%s\n",ent_abonne[14]);
    fprintf(Ptr,"%s\n",ent_abonne[15]);
    fprintf(Ptr,"%s\n",ent_abonne[16]);
    j = 0;
    for(;;){
        if(j > 5)break;
        fprintf(Ptr,"║   %1d    |%5.1f|%4.1f|%4.1f",
j+1,Seuil[j][0]*100,Seuil[j][1]*100,Seuil[j][2]*100);
        fprintf(Ptr,"|%4.1f|%3.0f|%3.0f|%3.0f║\n",
              Seuil[j][3]*100,Seuil[j][4]*100,
              Seuil[j][5]*100,Seuil[j][6]);
        ++j;
        }
    fprintf(Ptr,"%s\n",ent_abonne[17]);
    fprintf(Ptr,"%s\n",ent_abonne[18]);
    fprintf(Ptr,"%s\n",ent_abonne[19]);
    fprintf(Ptr,"%s\n",ent_abonne[20]);
    fprintf(Ptr,"%s\n",ent_abonne[21]);
```

```
    fprintf(Ptr,"%s\n",ent_abonne[22]);
    fprintf(Ptr,"%s\n",ent_abonne[23]);
    fprintf(Ptr,"%s\n",ent_abonne[24]);
    fprintf(Ptr,"||%5.1f|%4.1f|%4.1f",
         Es->SDtot*100,Es->SDlv*100,Es->SDar*100);
    fprintf(Ptr,"|%4.1f|%3.0f|%3.0f|%3.0f||\n",
            Es->SDap*100,Es->SCVs*100,
            Es->SCVt*100,Es->SDpd);
    fprintf(Ptr,"%s\n",ent_abonne[25]);
    free(Sra);
    free(Es);
    fclose(Ptr);
 }
    ++i;
    }
 if((mode_vds & TEMPS_REEL_P)){
    mode_vds = (mode_vds & 0x0f) | TEMPS_REEL;
 {
    printf("\033[12;10H");
    printf("LE PROCESSUS D'ABONNEMENT S'EST TERMINE NORMALLEMENT");
    printf("\033[14;10H");
    printf("Le numéro d'identification du nouvel abonné est: ");
    printf("%d",Bs->nip_ref);
    printf("\033[7m\033[22;5H Presser une touche pour continuer ");
    printf("\033[0m");
    bdos(1,0,0);
 }
    }
 else if(mode_vds & TEMPS_DIFFERE_P){
    mode_vds = (mode_vds & 0x0f) | TEMPS_DIFFERE;
    }
 }

 struct ETIQ *lect_etiq(Bs)
 struct BANQUE *Bs;
 {
 int   Erreur=0;
 long  Decalage;
 struct ETIQ *Es;
 FILE *Ptr;
 if((Es = (struct ETIQ *)calloc(1,sizeof(struct ETIQ))) == NULL){
    Erreur = 1;
    }
 if((Ptr = fopen(Bs->fichier,"r+b")) == NULL && !Erreur){
    Erreur = 2;
    }
 if(fseek(Ptr,50L,SEEK_SET) != 0 && !Erreur){
    Erreur = 3;
    }
 if(fread(&(Bs->nb_abonne),sizeof(int),1,Ptr) != 1 && !Erreur){
    Erreur = 4;
    }
 Decalage = (long)((Bs->nip_ref)*sizeof(struct ETIQ)+50L+sizeof(int));
 if(fseek(Ptr,Decalage,SEEK_SET) != 0 && !Erreur){
    Erreur = 5;
    }
 if(fread(&(*Es),sizeof(struct ETIQ),1,Ptr) != 1 && !Erreur){
    Erreur = 6;
    }
 if(Erreur){
    fprintf(stderr,"\nFonction: lect_etiq(), Erreur: %2d",Erreur);
    if(Erreur != 1){
       free(Es);
```

```
      }
   Es = NULL;
   }
fclose(Ptr);
return(Es);
}

void ecri_etiq(Es,Bs)
struct ETIQ   *Es;
struct BANQUE *Bs;
{
int   Erreur=0;
long  Decalage;
FILE *Ptr;
if((Ptr = fopen(Bs->fichier,"r+b")) == NULL){
   Erreur = 1;
   }
if(fseek(Ptr,50L,SEEK_SET) != 0 && !Erreur){
   Erreur = 2;
   }
if(fwrite(&(Bs->nb_abonne),sizeof(int),1,Ptr) != 1 && !Erreur){
   Erreur = 3;
   }
Decalage = (long)((Bs->nip_ref)*sizeof(struct ETIQ)+50L+sizeof(int));
if(fseek(Ptr,Decalage,SEEK_SET) != 0 && !Erreur){
   Erreur = 4;
   }
if(fwrite(&(*Es),sizeof(struct ETIQ),1,Ptr) != 1 && !Erreur){
   Erreur = 5;
   }
if(Erreur){
   fprintf(stderr,"\nFonction: ecri_etiq(), Erreur: %2d",Erreur);
   }
fclose(Ptr);
}

void ecri_ref(Sr,Bs)
struct BANQUE *Bs;
struct SIG    *Sr;
{
int   Erreur=0;
char  Fich[81];
FILE *Ptr;
sprintf(Fich,"%s%s___%02d.COR\0",Bs->reperto,Bs->ext,Bs->nip_ref);
if((Ptr = fopen(Fich,"w+b")) == NULL){
   Erreur = 1;
   }
if(fwrite(Sr,sizeof(struct SIG),1,Ptr) != 1 && !Erreur){
   Erreur = 2;
   }
if(Erreur){
   fprintf(stderr,"\nFonction: ecri_ref(), Erreur: %2d",Erreur);
   }
fclose(Ptr);
}

/* Listing -> file acqui.c */

#include "vds.h"
extern char mode_vsl;

struct SIG *acqui_sig(Mode,Fa)
int         Mode;
struct FA  *Fa;
```

```
{
struct SIG *Sig;
if((Sig = (struct SIG *)calloc(1,sizeof(struct SIG))) == NULL){
   printf("Erreur à l'allocation de sig\n");
   return(NULL);
   }
{
if(Mode == PENCEPT || Mode == SUMMA){
   efface();
   printf("\033[6;30H\033[1mPROCEDURE POUR SIGNER\033[0m");
   printf("\033[9;10H1. Prendre le crayon et signer votre signature.");
   printf("\033[11;10H");
   printf("2. Lorsque vous aurez terminé, presser l'interrupteur");
   printf("\033[12;10H   du crayon.");
   printf("\033[14;10H");
   printf("3. Un signal sonore, se fera entendre pour signifier la fin"
);
   printf("\033[15;10H   de l'acquisition de la signature");
   printf("\033[17;10H4. Un message sera alors affiché à l'écran.");
   printf("\033[22;5H\033[7m COMMENCER LA PROCEDURE ! \033[0m");
   }
}
if(acquisition(Mode,Sig,Fa)){
   free((char *)Sig);
   return(NULL);
   }
conver(Sig);
param_sp(Sig);
seg_dyn(Sig);
pretraite_i(Sig);
{
if(Mode == PENCEPT || Mode == SUMMA){
   efface();
   printf("\033[1;4m\033[12;31HS I G N A T U R E");
   printf("\033[14;29HE N R E G I S T R E E\033[0m");
   printf("\a");
   }
}
return(Sig);
}

int acquisition(Mode,Sig,Fa)
int         Mode;
struct SIG *Sig;
struct FA  *Fa;
{
int     i;
int     Proxi;
int     Commut;
int     Etat_pointe;
int     Dx;
int     Dy;
int     Angx;
int     Angy;
int     Desynchro;
char    Date[10];
char    Heure[10];
char    Ligne[81];
double Coor[NB_PT_MAX][2];
FILE  *Ptr;
if(Mode == PENCEPT || Mode == SUMMA){
{
   for(;;){
```

```
    synchronise(Mode,&Proxi,&Commut,&Etat_pointe);
    if(Proxi && Etat_pointe){
       Sig->dyn[0].pointe = Etat_pointe;
       acqui_coor(Mode,&Dx,&Dy,&Angx,&Angy);
       Coor[0][X] = (double)(Dx)*.00254;
       Coor[0][Y] = (double)(Dy)*.00254;
       break;}
    }
 for(;;){
    synchronise(Mode,&Proxi,&Commut,&Etat_pointe);
    if(Proxi){
       Sig->dyn[1].pointe = Etat_pointe;
       acqui_coor(Mode,&Dx,&Dy,&Angx,&Angy);
       Coor[1][X] = (double)(Dx)*.00254;
       Coor[1][Y] = (double)(Dy)*.00254;
       }
    if(hypot(Coor[1][X]-Coor[0][X],Coor[1][Y]-Coor[0][Y]) > 0.0127)break;
    }
 Desynchro = FAUX;
 i = 2;
 for(;;){
    if(synchronise(Mode,&Proxi,&Commut,&Etat_pointe)){
       Desynchro = VRAI;
       }
    if(Proxi){
{
       acqui_coor(Mode,&Dx,&Dy,&Angx,&Angy);
       if(Desynchro == VRAI){
          ++i;
          Sig->dyn[i].pointe   = Etat_pointe;
          Sig->dyn[i-1].pointe =  Etat_pointe;
          Coor[i][X]           = (double)(Dx)*.00254;
          Coor[i][Y]           = (double)(Dy)*.00254;
          Coor[i-1][X]         = (Coor[i][X] + Coor[i-2][X]) / 2.;
          Coor[i-1][Y]         = (Coor[i][Y] + Coor[i-2][Y]) / 2.;
          Desynchro = FAUX;
          filtre(i-1,Coor,Sig);
          filtre(i  ,Coor,Sig);
          derive(i-1,Coor,Sig);
          derive(i  ,Coor,Sig);
          }
       else{
          Sig->dyn[i].pointe = Etat_pointe;
          Coor[i][X]         = (double)(Dx)*.00254;
          Coor[i][Y]         = (double)(Dy)*.00254;
          filtre(i,Coor,Sig);
          derive(i,Coor,Sig);
          }
}
       ++i;
       }
    if((Commut && i > 50) || (i >= 990))break;
    }
 for(;;){
    --i;
    if(Sig->dyn[i].pointe || i < 51)break;
    }
 Sig->info.nb_point = i+1;
}
{
 sprintf(Fa->fich,"%s%03d%03d.a%02d\0",Fa->source,Fa->n_sig,
                                     Fa->n_imi ,Fa->n_essai);
```

```
   if((Ptr = fopen(Fa->fich,"w+")) == NULL){
      printf("\nErreur a l'ouverture de %s\n",Fa->fich);
      }
   else{
      _strdate(Date);
      _strtime(Heure);
      fprintf(Ptr,"@ %03d %03d A%02d %04d %s %s\n",Fa->n_sig,
Fa->n_imi,Fa->n_essai,Sig->info.nb_point,Date,Heure);
      }
   i = 0;
   for(;;){
      if(i == Sig->info.nb_point)break;
      fprintf(Ptr," %1d %05d %05d\n",Sig->dyn[i].pointe,
                          (int)Coor[i][X],(int)Coor[i][Y]);
      ++i;
      }
   fclose(Ptr);
}
   }
else if(Mode == FICHIER){
{
   sprintf(Fa->fich,"%s%03d%03d.a%02d\0",Fa->source,Fa->n_sig,
                                Fa->n_imi,Fa->n_essai);
   if((Ptr = fopen(Fa->fich,"r+")) == NULL){
      return(1);
      }
   else{
      fgets(Ligne,80,Ptr);
      }
}
{
   for(;;){
      if(fscanf(Ptr,"%d %d %d\n",&Etat_pointe,&Dx,&Dy) == EOF)break;
      if(Etat_pointe){
         Sig->dyn[0].pointe = Etat_pointe;
         Coor[0][X]        = (double)(Dx)*.00254;
         Coor[0][Y]        = (double)(Dy)*.00254;
         break;}
      }
   for(;;){
      if(fscanf(Ptr,"%d %d %d\n",&Etat_pointe,&Dx,&Dy) == EOF)break;
      Sig->dyn[1].pointe = Etat_pointe;
      Coor[1][X]        = (double)(Dx)*.00254;
      Coor[1][Y]        = (double)(Dy)*.00254;
      if(hypot(Coor[1][X]-Coor[0][X],Coor[1][Y]-Coor[0][Y]) > 0.0127)break;
      }
   i = 2;
   for(;;){
      if(fscanf(Ptr,"%d %d %d\n",&Etat_pointe,&Dx,&Dy) == EOF || i >
990)break;
      Sig->dyn[i].pointe = Etat_pointe;
      Coor[i][X]        = (double)(Dx)*.00254;
      Coor[i][Y]        = (double)(Dy)*.00254;
      filtre(i,Coor,Sig);
      derive(i,Coor,Sig);
      ++i;
      }
   for(;;){
      --i;
      if(Sig->dyn[i].pointe)break;
      }
   Sig->info.nb_point = i+1;
   fclose(Ptr);
```

```
}
   }
return(0);
}

void conver(Sig)
struct SIG *Sig;
{
int    i;
int    n;
double a[2];
double b[2];
n = Sig->info.nb_point - LF_FD;
i = LF_FD;
for(;;){
   if(i == n)break;
   Sig->dyn[i].vi[CURVI]=hypot(Sig->dyn[i].vc[X],Sig->dyn[i].vc[Y]);
   a[0] = Sig->dyn[i-1].vc[X];
   a[1] = Sig->dyn[i-1].vc[Y];
   b[0] = Sig->dyn[i].vc[X];
   b[1] = Sig->dyn[i].vc[Y];
   Sig->dyn[i].vi[ANG] = var_angle(a,b);
   ++i;
   }
}

void seg_dyn(Sig)
struct SIG *Sig;
{
int i;
int n;
int Nb_ch=1;
int Nbpt_ch=1;
int Nbpt_lv=0;
Sig->info.nb_composante = 0;
i = Sig->ch[Nb_ch][0] = LF_FD;
n = Sig->info.nb_point - LF_FD;
for(;;){
   if(i == n)break;
   if(Sig->dyn[i-1].pointe >  0 &&  Sig->dyn[i].pointe >  0){
{
      if(  Sig->dyn[i].vi[CURVI] <= (Sig->info.vit_moy/S_VIT_CURVI)){
         if(fabs(Sig->dyn[i].vi[ANG]) >= S_VIT_ANG){
            if(Nbpt_ch >= S_NB_POINT){
               Sig->ch[Nb_ch][1] = i-1;
               Sig->ch[++Nb_ch][0] = i;
               Nbpt_ch = 0;
               }
            }
         }
      Nbpt_ch++;
}
      }
   else if(Sig->dyn[i-1].pointe >  0 &&  Sig->dyn[i].pointe == 0){
{
      Nbpt_lv = 1;
}
      }
   else if(Sig->dyn[i-1].pointe == 0 && Sig->dyn[i].pointe == 0){
{
      if(++Nbpt_lv == 3){
         ++(Sig->info.nb_composante);
         if(Nbpt_ch >= S_NB_POINT){
            Sig->ch[Nb_ch++][1] = i-4;
```

```
            )
         )
)
      )
   else if(Sig->dyn[i-1].pointe == 0 &&  Sig->dyn[i].pointe >  0){
{
      if(Nbpt_lv >= 3){
         Sig->ch[Nb_ch][0] = i;
         Nbpt_ch = 1;
         }
      else{
         Nbpt_ch += Nbpt_lv;
         }
}
      }
   ++i;
   }
{
if(Nbpt_ch >= S_NB_POINT){
   Sig->ch[Nb_ch][1] = i-1;
   }
else{
   Nb_ch--;
   }
Sig->info.nb_chaine = Sig->ch[0][0] = Sig->ch[0][1] = Nb_ch;
}
}

void param_sp(Sig)
struct SIG *Sig;
{
int i;
int n;
Sig->info.Dlv = Sig->info.Dar = Sig->info.Dap = 0.0;
Sig->info.vit_moy = 0.0;
i = LF_FD;
n = Sig->info.nb_point - LF_FD;
for(;;){
   if(i == n)break;
   if(Sig->dyn[i].pointe == 0){
      Sig->info.Dlv += 1.;
      }
   if(Sig->dyn[i].vi[CURVI] < 0.8){
      Sig->info.Dar += 1.;
      }
   if(Sig->dyn[i].vi[ANG] >= 0.0){
      Sig->info.Dap += 1.;
      }
   Sig->info.vit_moy += Sig->dyn[i].vi[CURVI];
   ++i;
   }
Sig->info.Dtot = (Sig->info.nb_point - Sig->info.Dlv - 2 * LF_PB)/100.;
Sig->info.Dlv /= (double)(Sig->info.nb_point - 2 * LF_PB);
Sig->info.Dar /= (double)(Sig->info.nb_point - 2 * LF_FD);
Sig->info.Dap /= (double)(Sig->info.nb_point - 2 * LF_FD);
Sig->info.vit_moy /= (double)(Sig->info.nb_point - 2 * LF_FD);
}

void pretraite_i(Sig)
struct SIG *Sig;
{
int i;
int j;
```

```
int n;
int Nb_min=1;
int Nb_pt=1;
int Recherche=MIN;
double Vect[100][2];
double Xmin;
double Xmax;
double Del_x;
double Angle;
double Angle_o=3.0;
double m;
double b;
double Cos_angle;
double Sin_angle;
double X_rot;
double Y_rot;
double X_temp;
double Y_temp;
{
j = 0;
for(;;){
   if(j == 2)break;
{
   i = LF_PB;
   n = Sig->info.nb_point - LF_PB ;
   for(;;){
      if(Recherche == MIN){
         for(;;){
            if(Sig->dyn[i+1].cc[Y] > Sig->dyn[i].cc[Y]
&& Nb_pt > 5 && Sig->dyn[i].pointe){
               Recherche = MAX;
               if(Nb_min < 100){
               Vect[Nb_min][X] = Sig->dyn[i].cc[X];
               Vect[Nb_min++][Y] = Sig->dyn[i].cc[Y];
               Nb_pt = 1;
               }
               i++;
               break;}
            i++;
            Nb_pt++;
            if(i == n)break;
            }
         }
      if(i == n)break;
      if(Recherche == MAX){
         for(;;){
            if(Sig->dyn[i+1].cc[Y] < Sig->dyn[i].cc[Y] &&
Sig->dyn[i].pointe){
               if(Nb_pt > 5){
               Nb_pt = 1;
               }
               else{
               Nb_min--;
               }
               Recherche = MIN;
               i++;
               break;}
            i++;
            if(i == n)break;
            }
         }
      if(i == n)break;
      }
```

```
   if(Nb_min < 2){
      Vect[0][X] = Sig->dyn[LF_PB].cc[X];
      Vect[0][Y] = Sig->dyn[LF_PB].cc[Y];
      Vect[1][X] = Sig->dyn[n].cc[X];
      Vect[1][Y] = Sig->dyn[n].cc[Y];
      Nb_min = 2;
      }
}
{
   if(reg_lin(Vect,Nb_min,&m,&b)){
      printf("\nErreur suite au calcul de la ligne de base\n");
      }
   X_rot = Sig->dyn[LF_PB].cc[X];
   Y_rot = m * X_rot + b;
   Angle = -atan(m);
   if(fabs(Angle) < fabs(Angle_o)){
      Angle_o = Angle;
      if(fabs(Angle) < 1.0){
         Cos_angle = cos(Angle);
         Sin_angle = sin(Angle);
         i = LF_PB;
         for(;;){
            if(i == n)break;
            X_temp = Sig->dyn[i].cc[X] - X_rot;
            Y_temp = Sig->dyn[i].cc[Y] - Y_rot;
            Sig->dyn[i].cc[X] = X_temp * Cos_angle - Y_temp * Sin_angle;
            Sig->dyn[i].cc[Y] = X_temp * Sin_angle + Y_temp * Cos_angle;
            ++i;
            }
         }
      }
}
   ++j;
   }
}
{
Xmin =  20000.;
Xmax = -20000.;
i = LF_PB;
for(;;){
   if(i == n)break;
   if(Sig->dyn[i].cc[X] < Xmin){
      Xmin = Sig->dyn[i].cc[X];
      }
   if(Sig->dyn[i].cc[X] > Xmax){
      Xmax = Sig->dyn[i].cc[X];
      }
   ++i;
   }
Del_x = Xmax - Xmin;
i = LF_PB;
for(;;){
   if(i == n)break;
   Sig->dyn[i].cc[X] = (Sig->dyn[i].cc[X]-Xmin)*10000./Del_x;
   Sig->dyn[i].cc[Y] =  Sig->dyn[i].cc[Y]*5000./Del_x;
   ++i;
   }
}
}

void filtre(i,Coor,Sig)
int        i;
```

```
double      Coor[][2];
struct SIG *Sig;
{
int Indice;
int Depha;
int k;
int Nb_coef;
static double Coef[]={
 0.03704,  0.11111,  0.22222,
 0.25926,
 0.03704,  0.11111,  0.22222};
Nb_coef = 2 * LF_PB + 1;
if(i >= Nb_coef-1){
   Indice =  i - (Nb_coef - 1) / 2;
   Depha  =  Indice - (Nb_coef - 1) / 2;
   Sig->dyn[Indice].cc[X] = Sig->dyn[Indice].cc[Y] = 0.0;
   k = 0;
   for(;;){
      if(k == Nb_coef)break;
      Sig->dyn[Indice].cc[X] += (Coef[k] * Coor[Depha+k][X]);
      Sig->dyn[Indice].cc[Y] += (Coef[k] * Coor[Depha+k][Y]);
      ++k;
      }
   }
}

void derive(i,Coor,Sig)
int         i;
double      Coor[][2];
struct SIG *Sig;
{
int Indice;
int Depha;
int k;
int Nb_coef;
static double Coef[]={
-0.00459, -0.01316,  0.00504,
 0.04514,  0.03514, -0.07201,
-0.19204, -0.17550,  0.,
 0.17550,  0.19204,  0.07201,
-0.03514, -0.04514, -0.00504,
 0.01316,  0.00459};
Nb_coef = 2 * LF_FD + 1;
if(i >= Nb_coef-1){
   Indice =  i - (Nb_coef - 1) / 2;
   Depha  =  Indice - (Nb_coef - 1) / 2;
   Sig->dyn[Indice].vc[X] = Sig->dyn[Indice].vc[Y] = 0.0;
   k = 0;
   for(;;){
      if(k == Nb_coef)break;
      Sig->dyn[Indice].vc[X] += (Coef[k] * Coor[Depha+k][X]);
      Sig->dyn[Indice].vc[Y] += (Coef[k] * Coor[Depha+k][Y]);
      ++k;
      }
   Sig->dyn[Indice].vc[X] *= 100.;
   Sig->dyn[Indice].vc[Y] *= 100.;
   }
}

int synchronise(Mode,Proxi,Commut,Etat_pointe)
int  Mode;
int *Proxi;
```

```
int *Commut;
int *Etat_pointe;
{
int i;
int Octet;
if(Mode == PENCEPT){
{
   i = 0;
   for(;;){
      Octet = recoie();
      if((Octet & 0x40))break;
      if(++i == 9)break;
      }
   if(i != 9){
      *Proxi       = Octet & 0x01;
      *Commut      = Octet & 0x02;
      *Etat_pointe = Octet & 0x04;
      return(0);
      }
   else{
      return(i);
      }
}
   }
else if(Mode == SUMMA){
{
   i = 0;
   for(;;){
      Octet = recoie();
      if((Octet & 0x80))break;
      if(++i == 6)break;
      }
   if(i != 6){
      *Proxi       = !(Octet & 0x40);
      *Commut      =   Octet & 0x02;
      *Etat_pointe =   Octet & 0x01;
      return(0);
      }
   else{
      return(i);
      }
}
   }
}

void acqui_coor(Mode,Dx,Dy,Ax,Ay)
int  Mode;
int *Dx;
int *Dy;
int *Ax;
int *Ay;
{
int Octet;
if(Mode == PENCEPT){
{
   Octet  = recoie();
   *Dx    = (Octet & 0x3f) | ((Octet & 0x80) >> 1);
   Octet  = recoie();
   *Dx   |= (((Octet & 0x3f) | ((Octet & 0x80) >> 1)) << 7);
   Octet  = recoie();
   *Dy    = (Octet & 0x3f) | ((Octet & 0x80) >> 1);
   Octet  = recoie();
```

```
    *Dy   |= (((Octet & 0x3f) | ((Octet & 0x80) >> 1)) << 7);
    Octet = recoie();
    *Ax   = (Octet & 0x3f) | ((Octet & 0x80) >> 1);
    Octet = recoie();
    *Ay   = (Octet & 0x3f) | ((Octet & 0x80) >> 1);
    Octet = recoie();
    *Ax   = (((Octet & 0x07) << 7) | *Ax ) & 0x03ff;
    *Ay   = (((Octet & 0x38) << 4) | *Ay ) & 0x03ff;
}
   }
else if(Mode == SUMMA){
{
   Octet  = recoie();
   *Dx    = Octet & 0x7f;
   Octet  = recoie();
   *Dx   |= ((Octet & 0x7f) << 7);
   Octet  = recoie();
   *Dy    = Octet & 0x7f;
   Octet  = recoie();
   *Dy   |= ((Octet & 0x7f) << 7);
}
   }
}

int recoie()
{
int     Octet;
int     Drapeau;
for(;;){
   Drapeau = inp(0x3FD);
   if(Drapeau & 0x01)break;
   }
Octet = inp(0x3F8);
return(Octet);
}

double var_angle(v1,v2)
double v1[2];
double v2[2];
{
double Theta;
double Prod_norme;
double Prod_scal;
double Prod_vect;
Prod_scal = v1[0]*v2[0] + v1[1]*v2[1];
Prod_norme = hypot(v1[0],v1[1])*hypot(v2[0],v2[1]);
if(Prod_norme == 0.0){
   return(0.0);
   }
if((Prod_scal / Prod_norme) > 1.0){
   return(0.0);
   }
else{
   Theta = acos(Prod_scal / Prod_norme);
   }
Prod_vect = v1[0]*v2[1] - v1[1]*v2[0];
if(Prod_vect < 0.0){
   return(-Theta);
   }
else{
   return(Theta);
   }
}
```

```
int reg_lin(Vect,n,m,b)
double  Vect[][2];
int     n;
double *m;
double *b;
{
int     i;
double  Som_x;
double  Som_y;
double  Som_x_carre;
double  Som_x_y;
double  Det;
Som_x = Som_y = Som_x_carre = Som_x_y = 0.0;
i = 0;
for(;;){
   if(i == n)break;
   Som_x       += Vect[i][X];
   Som_y       += Vect[i][Y];
   Som_x_carre += (CARRE(Vect[i][X]));
   Som_x_y     += (Vect[i][X]*Vect[i][Y]);
   i++;
   }
Det = n * Som_x_carre - CARRE(Som_x);
if(Det == 0.0){
   *m = *b = 0.0;
   return(1);
   }
else{
   *m = (n * Som_x_y - Som_x * Som_y) / Det;
   *b = (Som_x_carre * Som_y - Som_x_y * Som_x) / Det;
   return(0);
   }
}
/* Listing -> file lib.c */

#include "vds.h"

void efface(void)
{
int i;
printf("\033[0m");
i = 5;
for(;;){
   if(i > 19)break;
   printf("\033[%d;2H                                        ",i);
   printf("                                    ");
   ++i;
   }
printf("\033[21;2H                                                      ");
printf("                           ");
printf("\033[22;2H                                                      ");
printf("                           ");
printf("\033[23;2H                                                      ");
printf("                           ");
printf("\033[1m\033[23;1H║\033[22;80H║\033[0m");
}

void cadre(void)
{
int j;
printf("\033[0m\033[2J\033[1m");
```

```
j = 1;
for(;;){
   if(j > 2)break;
   printf("════════════════════════════════════════");
   printf("════════════════════════════════════════\033[24;1H");
   ++j;
   }
printf("╚\033[1;1H╔\033[1;80H╗\033[24;80H╝\033[2;1H");
j = 2;
for(;;){
   if(j > 23)break;
   printf("║\033[%d;80H║",j);
   ++j;
   }
}

void delai(duree)
double duree;
{
time_t start, fini;
time(&start);
for(;;){
   time(&fini);
   if(difftime(fini,start) > duree)break;
   }
}

int acceptation(void)
{
int rep;
for(;;){
   rep = getch();
   if(rep == 'o' || rep == 'O'){
      return(1);
      break;}
   else if(rep == 'n' || rep == 'N'){
      return(0);
      break;}
   if(rep == 27){
      return(rep);
      break;}
   }
}

void cls(void)
{
printf("\033[0m\033[2J");
}
```

Although the present invention has been explained hereinabove by way of a preferred embodiment thereof, it should be pointed out that any modifications to this preferred embodiment, within the scope of the appended claims is not deemed to alter or change the nature and scope of the present invention.

The embodiments of the invention in which an exclusive property or privilege is claimed are defined as follows:

1. Apparatus for digitizing and segmenting a handwriting movement comprising:

an electrical transducer for generating three electrical digital position signals characterizing a trajectory of said handwriting movement, said transducer including a pencil provided with a point and an analog-to-digital tablet, said three signals being $D_x(t)$, $D_y(t)$ and $D_z(t)$, where $D_x(t)$ and $D_y(t)$ are respectively position signals according to X and Y axes of a cartesian reference with respect to time, and $D_z(t)$ is a discrete signal indicating whether or not said point is contacting said tablet;

means for low-pass filtering said $D_x(t)$ and $D_y(t)$ electrical signals;

means for taking the derivative of said $D_x(t)$ and $D_y(t)$ electrical signals by predetermined time and transfer functions for generating $V_x$ and $V_y$ electrical components which represent respectively speeds of said point according to X and Y axes of a cartesian reference;

means for calculating $V_\sigma$ and $V_\theta$ values from said $V_x$ and $V_y$ components where:

$$V_\sigma = \sqrt{\|V_x\|^2 + \|V_y\|^2},$$

and $$V_\theta = \pm\cos^{-1}\left[\frac{V_x \cdot V_y}{\|V_x\| \cdot \|V_y\|}\right],$$

where $V_\theta$ has a sign determined by:

$$\text{sign} = \left[\sin^{-1}\left[\frac{V_x \times V_y}{\|V_x\| \cdot \|V_y\|}\right]\right]; \text{ and}$$

means for calculating handwritten components and handwritten strings, where each of said handwritten components is delimited by two successive liftings of said point along said trajectory, and each of said handwritten strings is delimited by two successive portions of said trajectory where said $V_\theta$ value is higher than a predetermined angular speed value and said $V_\sigma$ value is lower than a predetermined curvilinear speed value.

2. Apparatus according to claim 1, comprising means for calculating, by means of $D_z(t)$, a first simple dynamic parameter consisting of a period of time of said trajectory during which said point of said pencil is contacting said tablet.

3. Apparatus according to claim 2 comprising means for calculating, by means of $D_z(t)$, a second simple dynamic parameter consisting of a percentage representative of a period of time of said trajectory during which said point is lifted.

4. Apparatus according to claim 3, comprising means for calculating, by means of said $D_x(t)$, $D_y(t)$ and $D_z(t)$, a third simple dynamic parameter consisting of a percentage representative of a period of time of said trajectory during which said point is stopped.

5. Apparatus according to claim 4, comprising means for calculating, by means of said $V_\theta$ value, a fourth simple dynamic parameter consisting of a percentage representative of a period of time of said trajectory during which said $V_\theta$ value is positive.

6. Apparatus according to claim 1, wherein said trajectory defines a base line, said apparatus comprising:

calculating means for applying respectively a first predetermined rotating operator and a second predetermined rotating operator to said $D_x(t)$ and $D_y(t)$ signals for correcting inclination of said trajectory and aligning said base line of said trajectory with a horizontal base line; and calculating means for scaling said $D_x(t)$ signal according to said X cartesian axis with values varying from 0 to 10,000, and for scaling said $D_y(t)$ according to said Y cartesian axis with a value of 0 when said $D_y(t)$ signal crosses said base line of said trajectory.

7. Apparatus according to claim 1, wherein said electrical transducer has substantially a sampling frequency of 100 Hz.

8. Apparatus according to claim 1, wherein said electrical transducer has substantially a resolution of 393.7 l/cm.

9. Apparatus according to claim 1, wherein said means for low-pass filtering is a low-pass filter having a bandwidth of 20 to 50 Hz.

10. Apparatus according to claim 9, wherein said low-pass filter has a predetermined time function $F_2(t_i)$ where:

$$F_2(t_i) = \frac{F(t_{i-3}) + 3F(t_{i-2}) + 6F(t_{i+1}) + 7F(t_i) + 6F(t_{i+1})}{27} + \frac{3F(t_{i+2}) + F(t_{i+3})}{27};$$

and said low-pass filter has a predetermined transfer function $H_2(\omega)$ where:

$$H_2(\omega) = \frac{7 + 12\cos(\omega) + 6\cos(2\omega) + 2\cos(3\omega)}{27}$$

11. Apparatus according to claim 10, wherein said means for deriving is a filter having a predetermined time function $F_5'(t_i)$ where:

$$F_5'(t_i) = \sum_{K=-N}^{N} C_K t_{i-K},$$

where $$C_K = \frac{\sin(\pi K/N)}{(\pi^2 K/N)}\left[\frac{\sin K\omega_c)}{K^2} - \frac{\omega_c\cos(K\omega_c)}{K}\right]$$

and $N = 9$, a predetermined transfer function $H_5(\omega)$ where:

$$H_5(\omega) =$$

$$2 \sum_{K=1}^{N} \frac{\sin(\pi K/N)}{\pi^2 K/N} \left[ \frac{\sin(K\omega_c)}{K^2} - \frac{\omega_c \cos(K\omega_c)}{K} \right] \sin(K\omega),$$

where: $\omega_c = \frac{2\pi F_c}{F_s}$ and $N = 9$, where:

$F_c$ is a cutoff frequency of 20 HZ, and
$F_s$ is a sampling frequency of 100 Hz.

12. Apparatus according to claim 1, wherein said predetermined angular speed is 50 rad/s., said predetermined curvilinear speed is $\overline{V}_\sigma/2$ cm/s., where $\overline{V}_\sigma$ is an average curvilinear speed of said point during said trajectory, said lifting of the pen has a minimal period of time of 0.03 s., and each of said handwritten strings has a minimal period of time of 0.05 s.

13. Apparatus according to claim 1, comprising:
means for calculating the following parameter values: $\overline{V}_\sigma$, $t_{0\sigma}$, $t_{1\sigma}$, $\mu_\sigma$ and $\sigma_\sigma$ so that $v_\sigma(t)$ matches with said $V_\sigma$ values along said trajectory where:

$$v_\sigma(t) = \frac{V_\sigma(t_{1\sigma} - t_{0\sigma})}{\sigma_\sigma \sqrt{2\pi}(t - t_{0\sigma})} \exp\left\{-\left[\ln\left(\frac{t - t_{0\sigma}}{t_{1\sigma} - t_{0\sigma}}\right) - \mu_\sigma\right]^2 \cdot \frac{1}{2\sigma_\sigma^2}\right\}; \text{ and}$$

means for calculating the following parameter values $\overline{V}_\theta$, $t_{0\theta}$, $t_{1\theta}$, $\mu_\theta$ and $\sigma_\theta$ so that $v_\theta(t)$ matches with said $v_\theta$ values along said trajectory, where:

$$v_\theta(t) = \frac{V_\theta(t_{1\theta} - t_{0\theta})}{\sigma_\theta \sqrt{2\pi}(t - t_{0\theta})} \exp\left\{-\left[\ln\left(\frac{t - t_{0\theta}}{t_{1\theta} - t_{0\theta}}\right) - \mu_\theta\right]^2 \cdot \frac{1}{2\sigma_\theta^2}\right\}.$$

14. Apparatus according to claim 13, comprising memory means for registering said parameter values $\overline{V}_\sigma$, $t_{0\sigma}$, $t_{1\sigma}$, $\mu_\sigma$, $\sigma_\sigma$, $\overline{V}_\theta$, $t_{0\theta}$, $t_{1\theta}$, $\mu_\theta$ and $\sigma_\theta$, whereby said handwriting movement is memorized and data compression is achieved.

15. Apparatus for digitizing and segmenting a handwriting movement, comprising:
an electrical transducer for generating three electrical digital position signals characterizing a trajectory of said handwriting movement, said transducer including a pencil provided with a point and an analog-to-digital tablet, said three signals being $D_x(t)$, $D_y(t)$ and $D_z(t)$, where $D_x(t)$ and $D_y(t)$ are respectively position signals according to X and Y axes of a cartesian reference with respect to time, and $D_z(t)$ is a discrete signal indicating whether or not said point is contacting said tablet, said electrical transducer having substantially a sampling frequency of 100 Hz, said electrical transducer having substantially a resolution of 393.7 l/cm;
means for low-pass filtering said $D_x(t)$ and $D_y(t)$ electrical signals, said means for low-pass filtering being a low-pass filter having a bandwidth of 20 to 50 Hz, said low-pass filter having a predetermined time function $F_2(t_i)$ where:

$$F_2(t_i) = \frac{F(t_{i-3}) + 3F(t_{i-2}) + 6F(t_{i+1}) + 7F(t_i) + 6F(t_{i+1})}{27} + \frac{3F(t_{i+2}) + F(t_{i+3})}{27}; \text{ and}$$

said low-pass filter having a predetermined transfer function $H_2(\omega)$ where:

$$H_2(\omega) = \frac{7 + 12\cos(\omega) + 6\cos(2\omega) + 2\cos(3\omega)}{27}$$

means for taking the derivative of said $D_x(t)$ and $D_y(t)$ electrical signals by predetermined time and transfer functions for generating $V_x$ and $V_y$ electrical components which represent respectively speeds of said point according to X and Y axes of a cartesian reference, said means for deriving being a filter having a predetermined time function $F_5'(t_i)$ where:

$$F_5'(t_i) = \sum_{K=-N}^{N} C_K t_{i-K},$$

where $$C_K = \frac{\sin(\pi K/N)}{(\pi^2 K/N)} \left[ \frac{\sin(K\omega_c)}{K^2} - \frac{\omega_c \cos(K\omega_c)}{K} \right]$$

and $N = 9$, said means for deriving having a predetermined transfer function $H_5(\omega)$ where:

$$H_5(\omega) =$$

$$2 \sum_{K=1}^{N} \frac{\sin(\pi K/N)}{\pi^2 K/N} \left[ \frac{\sin(K\omega_c)}{K^2} - \frac{\omega_c \cos(K\omega_c)}{K} \right] \sin(K\omega),$$

where:

$\omega_c = \frac{2\pi F_c}{F_s}$ and $N = 9$, where:
$F_c$ is a cutoff frequency of 20 Hz, and
$F_s$ is a sampling frequency of 100 Hz;
means for calculating $V_\sigma$ and $V_\theta$ values from $V_x$ and $V_y$ components where:

$$V_\sigma = \sqrt{\|V_x\|^2 + \|V_y\|^2},$$

and $$V_\theta = \pm \cos^{-1}\left[\frac{V_x \cdot V_y}{\|V_x\| \cdot \|V_y\|}\right],$$

where $V_\theta$ has a sign determined by:

$$\text{sign} = \left[\sin^{-1}\left[\frac{V_x \times V_y}{\|V_x\| \cdot \|V_y\|}\right]\right]; \text{ and}$$

means for calculating handwritten components and handwritten strings, where each of said handwritten components is delimited by two successive liftings of said point along said trajectory, and each of said handwritten strings is delimited by two successive portions of said trajectory where said $V_\theta$ value is higher than a predetermined angular speed value, said $V_\sigma$ value is lower than a predetermined curvilinear speed value, said predetermined angular speed is 50 rad/s., said predetermined curvilinear speed is $\bar{V}_\sigma/2$ cm/s., where $\bar{V}_\sigma$ is an average curvilinear speed of said point during said trajectory, said lifting of the pen has a minimal period of time of 0.03 s., and each of said handwritten strings has a minimal period of time of 0.05 s;

means for calculating, by means of said $D_z(t)$, a first simple dynamic parameter consisting of a period of time of said trajectory during which said point of said pencil is contacting said tablet;

means for calculating, by means of $D_z(t)$, a second simple dynamic parameter consisting of a percentage representative of a period of time of said trajectory during which said point is lifted;

means for calculating, by means of said $D_x(t)$, $D_y(t)$ and $D_z(t)$, a third simple dynamic parameter consisting of a percentage representative of a period of time of said trajectory during which said point is stopped;

means for calculating, by means of said $V_\theta$ value, a fourth simple dynamic parameter consisting of a percentage representative of a period of time of said trajectory during which said $V_\theta$ value is positive;

calculating means for applying respectively a first predetermined rotating operator and a second predetermined rotating operator to said $D_x(t)$ and $D_y(t)$ signals for correcting inclination of said trajectory and aligning a base line of said trajectory with a horizontal base line; and calculating means for scaling said $D_x(t)$ signal according to said X cartesian axis with values varying from 0 to 10,000, and for scaling said $D_y(t)$ according to said Y cartesian axis with a value of 0 when said $D_y(t)$ signal crosses said base line of said trajectory.

16. Method for digitizing and segmenting a handwriting movement, comprising steps of:

generating three electrical digital position signals characterizing a trajectory of said handwriting movement, by means of a transducer including a pencil provided with a point and an analog-to-digital tablet, said three signals being $D_x(t)$, $D_y(t)$ and $D_z(t)$, where $D_x(t)$ and $D_y(t)$ are respectively position signals according to X and Y axes of a cartesian reference with respect to time, and $D_z(t)$ is a discrete signal indicating whether or not said point is contacting said tablet;

filtering said $D_x(t)$ and $D_y(t)$ electrical signals;

taking the derivative of said $D_x(t)$ and $D_y(t)$ electrical signals by predetermined time and transfer functions for generating $V_x$ and $V_y$ electrical components which represent respectively speeds of said point according to X and Y axes of a cartesian reference;

calculating $V_\sigma$ and $V_\theta$ values from said $V_x$ and $V_y$ components where:

$$V_\sigma = \sqrt{\|V_x\|^2 + \|V_y\|^2},$$

and $$V_\theta = \pm\cos^{-1}\left[\frac{V_x \cdot V_y}{\|V_x\| \cdot \|V_y\|}\right],$$

where $V_\theta$ has a sign determined by:

$$\text{sign} = \left[\sin^{-1}\left[\frac{V_x \cdot V_y}{\|V_x\| \times \|V_y\|}\right]\right]; \text{ and}$$

calculating handwritten components and handwritten strings, where each of said handwritten components is delimited by two successive liftings of said point along said trajectory, and each of said handwritten strings is delimited by two successive portions of said trajectory where said $V_\theta$ value is higher than a predetermined angular speed value and said $V_\sigma$ value is lower than a predetermined curvilinear speed value.

17. Method according to claim 16, comprising a step of calculating, by means of $D_z(t)$, a first simple dynamic parameter consisting of a period of time of said trajectory during which said point of said pencil is contacting said tablet.

18. Method according to claim 17, comprising a step of calculating, by means of $D_z(t)$, a second simple dynamic parameter consisting of a percentage representative of a period of time of said trajectory during which said point is lifted.

19. Method according to claim 18, comprising a step of calculating, by means of said $D_x(t)$, $D_y(t)$ and $D_z(t)$, a third simple dynamic parameter consisting of a percentage representative of a period of time of said trajectory during which said point is stopped.

20. Method according to claim 19, comprising a step of calculating, by means of said $V_\theta$ value, a fourth simple dynamic parameter consisting of a percentage representative of a period of time of said trajectory during which said $V_\theta$ value is positive.

21. Method according to claim 16, wherein said trajectory defines a base line, said method comprising steps of:

applying respectively a first predetermined rotating operator and a second predetermined rotating operator to said $D_x(t)$ and $D_y(t)$ signals for correcting inclination of said trajectory and aligning said base line of said trajectory with a horizontal base line; and scaling said $D_x(t)$ signal according to said X cartesian axis with values varying from 0 to 10,000, and scaling said $D_y(t)$ according to said Y cartesian axis with a value of 0 when said $D_y(t)$ signal crosses said base line of said trajectory.

22. Method according to claim 16, wherein said step of low-pass filtering said $D_x(t)$ and $D_y(t)$ electrical signals is made by means of a low-pass filter having a bandwidth of 20 to 50 Hz, a predetermined time function $F_2(t_i)$, where:

$$F_2(t_1) = \frac{F(t_{i-3}) + 3F(t_{i-2}) + 6F(t_{i+1}) + 7F(t_i) + 6F(t_{i+1})}{27} + \frac{3F(t_{i+2}) + F(t_{i+3})}{27}\text{; and}$$

said low-pass filter having a predetermined transfer function $H_2(\omega)$ where:

$$H_2(\omega) = \frac{7 + 12\cos(\omega) + 6\cos(2\omega) + 2\cos(3\omega)}{27}$$

23. Method according to claim 22, wherein said step of deriving is made by means of a filter having a predetermined time function $F_5'(t_i)$ where:

$$F_5'(t_i) = \sum_{K=-N}^{N} C_K t_{i-K},$$

where $$C_K = \frac{\sin(\pi K/N)}{(\pi^2 K/N)}\left[\frac{\sin(K\omega_c)}{K^2} - \frac{\omega_c\cos(K\omega_c)}{K}\right]$$

and $N = 9$, and a predetermined transfer function $H_5(\omega)$ where:

$$H_5(\omega) = 2\sum_{K=1}^{N}\frac{\sin(\pi K/N)}{\pi^2 K/N}\left[\frac{\sin(K\omega_c)}{K^2} - \frac{\omega_c\cos(K\omega_c)}{K}\right]\sin(K\omega),$$

where:

$$\omega_c = \frac{2\pi F_c}{F_s} \text{ and } N = 9,$$

$F_c$ is a cutoff frequency of 20 HZ, and
$F_s$ is a sampling frequency of 100 Hz.

24. Method according to claim 16, wherein said predetermined angular speed is 50 rad/s., said predetermined curvilinear speed is $\overline{V}_\theta/2$ cm/s., where $\overline{V}_\sigma$ is an average curvilinear speed of said point during said trajectory, said lifting of the pen has a minimal period of time of 0.03 s., and each of said handwritten strings has a minimal period of time of 0.05 s.

25. Method according to claim 16, comprising:

a step of calculating the following parameter values: $\overline{V}_\sigma$, $t_{0\sigma}$, $t_{1\sigma}$, $\mu_\sigma$ and $\sigma_\sigma$ so that $v_\sigma(t)$ matches with said $V_\sigma$ values along said trajectory where:

$$v_\sigma(t) = \frac{V_\sigma(t_{1\sigma} - t_{0\sigma})}{\sigma_\sigma\sqrt{2\pi}\,(t - t_{0\sigma})}\exp - \left\{\left[\ln\left(\frac{t - t_{0\sigma}}{t_{1\sigma} - t_{0\sigma}}\right) - \mu_\sigma\right]^2 \cdot \frac{1}{2\sigma_\sigma^2}\right\}\text{; and}$$

a step of calculating the following parameter values: $\overline{V}_\theta$, $t_{0\theta}$, $t_{1\theta}$, $\mu_\theta$ and $\sigma_\theta$ so that $v_\theta(t)$ matches with said $V_\theta$ values along said trajectory, where:

$$v_\theta(t) = \frac{V_\theta(t_{1\theta} - t_{0\theta})}{\sigma_\theta\sqrt{2\pi}\,(t - t_{0\theta})}\exp - \left\{\left[\ln\left(\frac{t - t_{0\theta}}{t_{1\theta} - t_{0\theta}}\right) - \mu_\theta\right]^2 \cdot \frac{1}{2\sigma_\theta^2}\right\}.$$

26. Method according to claim 25, comprising a step of registering said parameter values $\overline{V}_\sigma$, $t_{0\sigma}$, $t_{1\sigma}$, $\mu_\sigma$, $\sigma_\sigma$, $\overline{V}_\theta$, $t_{0\theta}$, $t_{1\theta}$, $\mu_\theta$ and $\sigma_\theta$, whereby said handwriting movement is memorized and dada compression is achieved.

* * * * *